US008073265B2

(12) United States Patent
Liao et al.

(10) Patent No.: US 8,073,265 B2
(45) Date of Patent: Dec. 6, 2011

(54) IMAGE MANAGING APPARATUS AND IMAGE DISPLAY APPARATUS

(75) Inventors: Baiping Liao, Saitama (JP); Ichiro Ueno, Saitama (JP); Chao Xu, Tokyo (JP); Tamaki Kojima, Kanagawa (JP); Tomohiko Gotoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 879 days.

(21) Appl. No.: 11/563,867

(22) Filed: Nov. 28, 2006

(65) Prior Publication Data

US 2007/0211151 A1 Sep. 13, 2007

(30) Foreign Application Priority Data

Dec. 6, 2005 (JP) .................................. 2005-351400

(51) Int. Cl.
*G06K 9/62* (2006.01)
(52) U.S. Cl. ...... 382/225; 382/228; 348/232; 348/231.2
(58) Field of Classification Search .................. 382/225, 382/228; 348/232
See application file for complete search history.

(56) References Cited

U.S. PATENT DOCUMENTS

2001/0022621 A1* 9/2001 Squibbs ........................ 348/232

FOREIGN PATENT DOCUMENTS

| JP | 5-128166 | 5/1993 |
|---|---|---|
| JP | 10-233985 | 9/1998 |
| JP | 2001-228528 | 8/2001 |
| JP | 2003-18506 | 1/2003 |
| JP | 2003-44486 | 2/2003 |
| JP | 2003-44491 | 2/2003 |

OTHER PUBLICATIONS

U.S. Appl. No. 11/559,695, filed Nov. 14, 2006, Baiping, et al.
U.S. Appl. No. 11/595,244.
U.S. Appl. No. 11/635,801.
U.S. Appl. No. 11/794,738, filed Jul. 5, 2007, Liao, et al.
Mor Naaman, et al., "Automatic Organization for Digital Photographs with Geographic Coordinates", Digital Libraries, 2004., Proceedings of the 2004 Joint ACM/IEEE Conference, XP010725683, ISBN: 978-1-58113-832-0, Jun. 7, 2004, pp. 53-62.
Mor Naaman, et al.,"Context data in geo-referenced digital photo collections", Proceedings of the ACM International Conference on mltimedia, XP002415095, Oct. 10, 2004, pp. 196-203.
Daniel Bauer, et al., "Spatial tools for Managing Personal Information Collections", Proceedings of the 38th Hawaii International Conference on System Sciences 2005, XP010762465, Jan. 3, 2005, pp. 1-10.

(Continued)

*Primary Examiner* — Samir Ahmed
*Assistant Examiner* — Ruiping Li
(74) *Attorney, Agent, or Firm* — Oblon, Spivak, McClelland, Maier & Neustadt, L.L.P.

(57) ABSTRACT

An image managing apparatus is provided. The apparatus includes image information storage means that stores image information corresponding to captured image data, and cluster managing means that manages the image information by hierarchical clusters that include a plurality of layers of clusters and whose structure is fixed from an uppermost layer to a predetermined layer on the way to a lowermost layer.

18 Claims, 21 Drawing Sheets

OTHER PUBLICATIONS

Hyunmo Kang, et al., "Visualization Methods for Personal Photo Collections: Browsing and Searching in the PhotoFinder", Multimedia and Expo, 2000. ICME 2000. 2000 IEEE International Conference, vol. 3, XP010512799, ISBN: 978-0-7803-6536-0, Jul. 30, 2000, pp. 1539-1542.

Ben Shneiderman, et al., "Direct Annotation: A Drag-and-Drop Strategy for Labeling Photos", Information Visualization, 2000. Proceedings. IEEE International Conference, XP010503728, ISBN: 978-0-7695-0743-9, Jul. 19, 2000, pp. 88-95.

* cited by examiner

LAYER1 LEVEL1
LAYER1 LEVEL2

WORLD MAP

LAYER2 LEVEL1
LAYER2 LEVEL2

WORLD AREA MAP

LAYER3 LEVEL1
LAYER3 LEVEL2

COUNTRY MAP

LAYER4 LEVEL1
LAYER4 LEVEL2

REGIONAL MAP

LAYER5 LEVEL1
LAYER5 LEVEL2

CITY OUTLINE MAP

LAYER6 LEVEL1
LAYER6 LEVEL2

DETAILED CITY MAP

LAYER1
LEVEL1

NUMBER OF FOLDERS
DISPLAYED = (6)

LAYER1
LEVEL2

NUMBER OF FOLDERS
DISPLAYED = (10)

IMAGE MANAGING APPARATUS AND IMAGE DISPLAY APPARATUS

BACKGROUND OF THE INVENTION

1. Field of the Invention

The present invention relates to an image managing apparatus and an image display apparatus, and relates particularly to an apparatus and processing method for organizing and displaying captured images as well as to a program that makes a computer execute such a processing method.

2. Description of Related Art

Imaging devices for capturing images have become popular, and it has become possible for many users to capture various images with ease. Since users can capture images without difficulty, they may take photographs of streets or landscapes as they please, as a result of which huge quantities of captured image data become accumulated.

When large quantities of image data are accumulated in such a manner, it becomes difficult for users to memorize all the locations at which those images were taken even if they are captured by the users themselves. For this reason, it becomes necessary to have the captured image data and the captured locations thereof be linked in some way. For example, there is proposed a recording system that records image data captured by a camera section and location data obtained from a GPS (Global Positioning System) in such a manner that the two are associated with each other (see, for example, Japanese Published Unexamined Application No. 2003-18506 (FIG. 1)).

SUMMARY OF THE INVENTION

In order to organize image data based on such location data that are associated with the image data, it is effective to group data that are in proximity to one another within a feature space, and hierarchical clustering algorithms are known as a method for doing that. A hierarchical clustering algorithm is a method of grouping where data are managed in a tree structure, referred to as a cluster tree, and close data are grouped in the same node.

However, in an ordinary hierarchical clustering algorithm, it is required that a one-to-one distance calculation be performed with respect to all of the data, and since the amount of such calculations is on the order of the square of the volume of the image data, the amount of calculations increases exponentially as the volume of the image data increases. Therefore, with respect to mobile devices which do not necessarily have advanced processing capabilities, there is a possibility that simply applying hierarchical clustering algorithms to them might bring about problems.

As such, it is desirable to realize a management means that is suitable for visually managing image data. The present invention is conceived in view of the above.

The present invention is made in view of the issue above, and an aspect thereof is an image managing apparatus that includes image information storage means that stores image information corresponding to captured image data, and cluster managing means that manages the image information by way of hierarchical clusters including a plurality of layers of clusters whose structure from the uppermost layer up to a predetermined layer on the way down to the lowermost layer is fixed. As a result, management of, by way of hierarchical clusters, image information corresponding to image data can be simplified.

Here, if it is assumed that the image information is such that location information regarding the places where the image data are captured is included, the cluster managing means may manage the image information in accordance with the relative distance based on the location information.

It is noted that by adding a fixed property to the clusters, even if a cluster is of a lower layer than the predetermined layer, the cluster managing means may carry out management with the structure of this cluster fixed so long as this cluster has a fixed property.

Another aspect of the present invention is an image display apparatus that includes image information storage means that stores location information regarding the places at which image data are captured, display layer determining means that determines, of all the layers from the uppermost layer down to the lowermost layer, a layer to be displayed as a display layer, drawing means that draws, with respect to the display layer, the places at which the image data are captured as an image location display based on the location information, map storage means that stores a map for each of the layers from the uppermost layer up to a predetermined layer on the way down to the lowermost layer, and map obtaining means that obtains a map corresponding to the display layer if such a map is stored in the map storage means. If the map corresponding to the display layer is obtained by the map obtaining means, the drawing means superposes the map with the image location display. As a result, in displaying the places at which the image data are captured as the image location display, a map is superposed with the image location display only if a map of the corresponding layer exists.

In addition, with respect to this apparatus, the drawing means, in the event that the map corresponding to the display layer is obtained, may draw the image location display based on specific positions on the map or on the relative locations of the places where the image data are captured, and in the event that the map corresponding to the display layer is not obtained, may draw the image location display based on the relative locations of the places where the image data are captured. As a result, it is possible to, when no map exists, have the positional relationship be intuitively understood by performing the image location display based on the relative locations of the places where the image data are captured.

In addition, with respect to this apparatus, the drawing means may be such that up to a certain layer somewhere along the way from the uppermost layer to the lowermost layer it does not display the content of the image data as the image location display, while it does display the content of the image data as the image location display for layers below this certain layer. As a result, it is advantageous in that the display is kept abstract at the upper layers, and more detailed information is provided at the lower layers. In addition, when a map corresponding to the display layer is obtained, the content of the image data is not displayed as the image location display, and when a map corresponding to the display layer is not obtained, the content of the image data is displayed as the image location display, thereby linking the absence or presence of a map with the displaying of the content of image data.

In addition, another aspect of the present invention is an image display apparatus including image information storage means that stores location information regarding places at which image data are captured, cluster managing means that manages the image information by way of hierarchical clusters including a plurality of layers of clusters whose structure from the uppermost layer up to a predetermined layer on the way down to the lowermost layer is fixed, display layer specifying means that specifies, from the layers from the uppermost layer down to the lowermost layer, a layer to be displayed as a display layer, drawing means that draws, with respect to the display layer, the places where the image data are captured as an image location display based on the location information, map storage means that stores a map for each of the layers from the uppermost layer up to the predetermined layer, and map obtaining means that obtains a map corresponding to the display layer if such a map is stored in the map storage means. If the map corresponding to the display layer is stored in the map storage means, the drawing means superposes the map obtained by the map obtaining means with the image location display. As a result, it is possible to simplify image data management by, in managing the location information of image data by way of hierarchical clusters, taking those up to the predetermined layer to be fixed clusters, and by having only the maps corresponding to those fixed clusters be stored in the map storage means.

In addition, another aspect of the present invention is, with respect to an image managing apparatus that manages by means of a node tree having a tree structure location information of places where image data are captured, an image managing method including a step of setting as an initial branch node, with an area from the uppermost layer in the node tree up to a predetermined layer on the way down to the lowermost layer taken to be a fixed area, a node in a layer directly below the fixed area that is close in distance to the location information of image data that is to be newly added, a step of recursively updating the branch node by tracing a node, from nodes that are lower than the branch node, that is close in distance to the location information of the image data that is to be newly added, a step of, with a node, from nodes that are below the branch node, that is close to the location information of the image data to be newly added taken to be a candidate node, generating a new node between the branch node and the candidate node, and of linking a child node of the new node and the image data to be newly added. Another aspect of the present invention is a program that makes a computer execute these steps. As a result, new image data can be managed efficiently.

Another aspect of the present invention is, with respect to an image display method for an image managing apparatus that includes image information storage means that stores location information regarding places at which image data are captured, map storage means that stores a map for each of the layers from an uppermost layer up to a predetermined layer on the way down to a lowermost layer. The method includes: accepting an enlargement or reduction operation with respect to an image location display indicating the places where the image data are captured; when a display layer to be displayed, of the layers from the uppermost layer to the lowermost layer, is to be altered through the operation, obtaining a map corresponding to the display layer if such a map is stored in the map storage means; drawing as the image location display the places at which the image data are captured based on the location information with respect to the display layer; and superposing the map corresponding to the display layer with the image location display if such a map is obtained. Another aspect of the present invention is a program that makes a computer execute these steps. As a result, in displaying as the image location display the places at which the image data are captured, it is possible to superpose a map of the corresponding layer with the image location display only in the event that such a map exists.

According to the present invention, it is possible to visually and efficiently manage image data.

DETAILED DESCRIPTION OF EMBODIMENTS

Embodiments of the present invention will be described with reference to the drawings.

Figure 1:
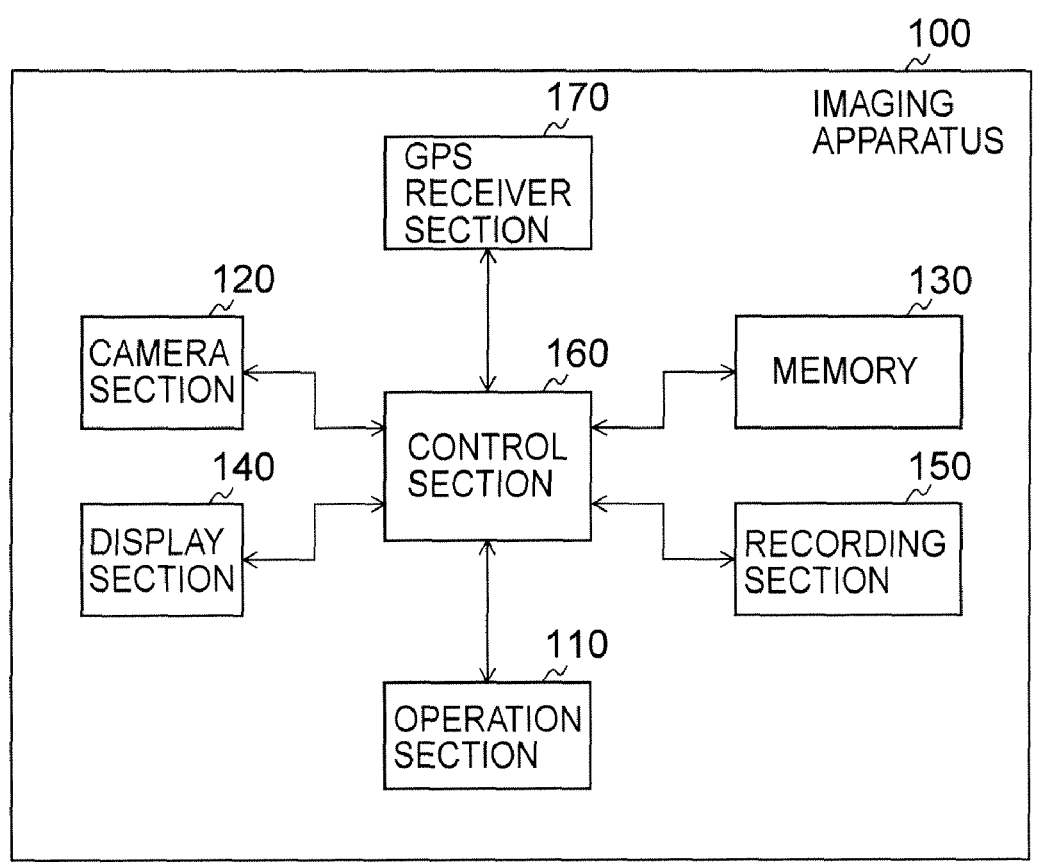
FIG. 1 is a diagram indicating one configuration example of an imaging apparatus 100 in an embodiment of the present invention.

FIG. 1 is a diagram indicating one configuration example of an imaging apparatus 100 in an embodiment of the present invention. This imaging apparatus 100 includes an operation section 110, a camera section 120, a memory 130, a display section 140, a recording section 150, a control section 160 and a GPS receiver section 170.

The operation section 110 accepts operational input from a user. This operation section 110 may be realized as operational buttons provided on the imaging apparatus 100, as a touch panel integrated into the display section 140 and the like.

The camera section 120 captures a subject and includes an optical block, such as lenses and the like, and a signal conversion section, such as a CCD (Charge Coupled Device) and the like. The memory 130 is a work area for temporarily retaining moving image data captured by the camera section 120, and volatile memory is generally used to this end.

The display section 140 is there to display on a monitor, such as an LCD (Liquid Crystal Display) and the like, a moving image being captured or replayed. It is to be noted that this display section 140, as described above, may be integrated with the operation section 110.

The recording section 150 records a captured moving image and/or information associated therewith, and a nonvolatile recording medium is generally used. The control section 160 controls various parts of the imaging apparatus 100, and may be realized, for example, through a microcomputer that is program controlled.

The GPS receiver section 170 receives signals from a GPS (Global Positioning System) satellite, and obtains current latitude-longitude coordinates (location information) on the globe. The reception principles at work here are similar to general GPS reception schemes. The GPS receiver section 170 may include an antenna section that receives GPS signals, a signal conversion section for the received signals, a location information computing section, a temporary storage section for the computed results, and an interface section for the control section 160.

Figure 2:
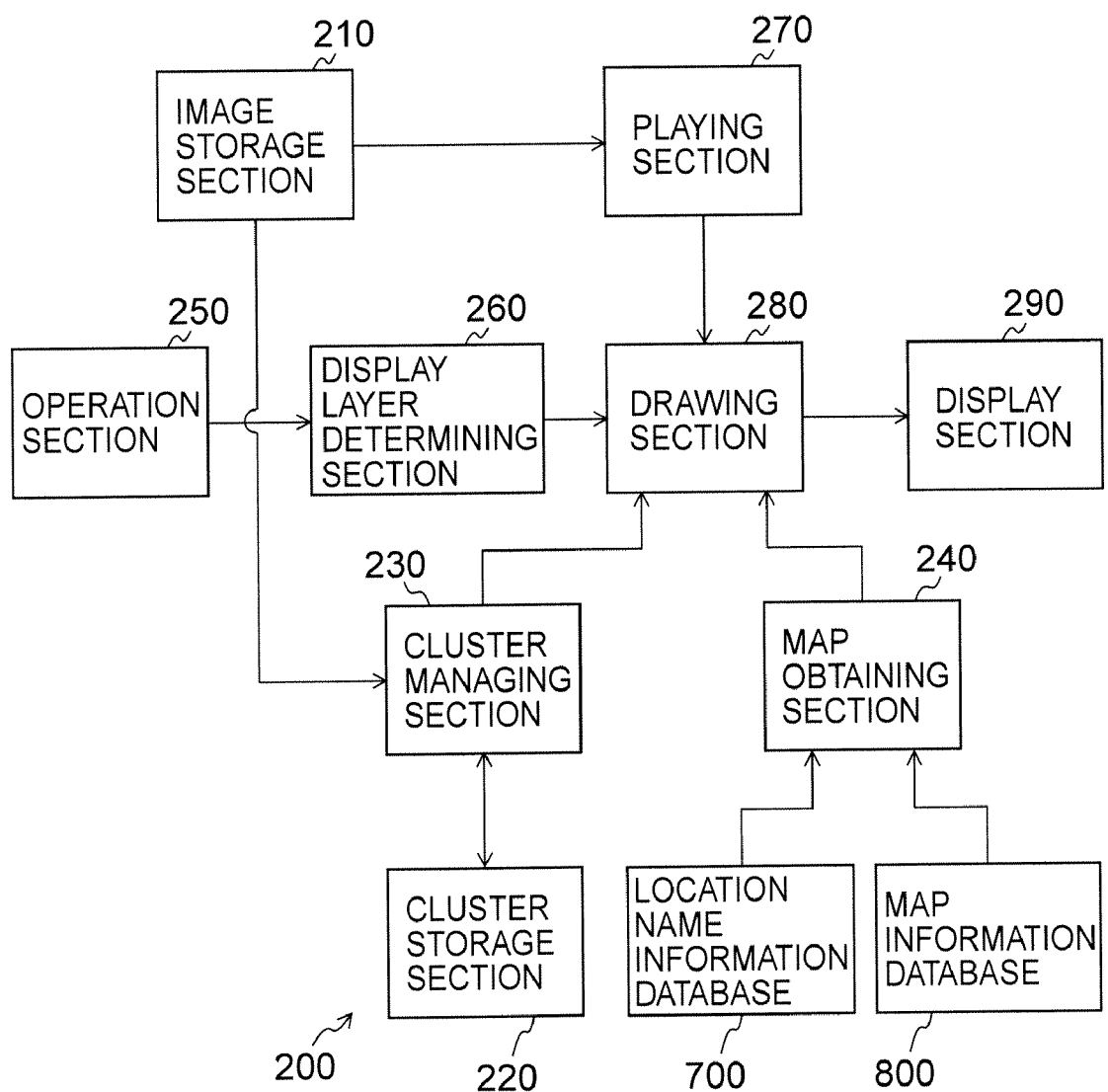
FIG. 2 is a diagram indicating one configuration example of an image display apparatus 200 in an embodiment of the present invention.

FIG. 2 is a diagram indicating one configuration example of an image display apparatus 200 in an embodiment of the present invention. This image display apparatus 200 may include an image storage section 210, a cluster storage section 220, a cluster managing section 230, a location name information database 700, a map information database 800, a map obtaining section 240, an operation section 250, a display layer determining section 260, a playing section 270, a drawing section 280 and a display section 290.

It is noted that the image display apparatus 200 may be incorporated as part of the imaging apparatus 100, or it may be realized as an individual apparatus. In the latter case, it could be understood as such that image data generated by the imaging apparatus 100 is supplied to the image display apparatus 200 via the image storage section 210.

The image storage section 210 stores captured image data. If the image display apparatus 200 is incorporated as part of the imaging apparatus 100, this image storage section 210 may be realized by the internal memory 130. If the image display apparatus 200 is an individual apparatus that is separate from the imaging apparatus 100, the image storage section 210 may be realized by a detachable recording medium or the like such as a flash memory or the like. In addition, image data may also be stored in the image storage section 210 via a network.

The cluster storage section 220 stores image information corresponding to the image data. In order to manage the image information through hierarchical clusters, this cluster storage section 220 stores a node tree of a tree structure, and links image information with each of the end nodes. As a result, the image information is managed in such a manner that it belongs to hierarchical clusters including a plurality of layers of clusters.

The cluster managing section 230 manages the image information stored in the cluster storage section 220 by hierarchical clusters. Details of this management by the cluster managing section 230 will be described later.

The location name information database 700 is a database that stores location name information in association with location information by latitude and longitude. The map information database 800 is a database that stores map information for drawing maps in association with location information by latitude and longitude. The map obtaining section 240 indexes the location name information database 700 and the map information database 800, and obtains corresponding maps and location name information.

The operation section 250, much like the operation section 110, accepts operational input from the user, and may be realized as operational buttons provided on the image display apparatus 200, a touch panel incorporated into the display section 290, or the like. Here, as a specific example of an operational input from the user, an operational input relating to the enlargement or reduction of an image location display indicating the places at which the image data are captured will be performed.

The display layer determining section 260 determines the display layer for the image location display in accordance with the enlargement or reduction operational input performed through the operation section 250. As will be described later, there are a plurality of layers for the image location display from a layer of a world map to a layer of detailed city maps, and the display layer determining section 260 determines which of these layers are to be made the display layer.

The playing section 270 plays the image data stored in the image storage section 210. This image playing section 270 not only plays the image data itself, but is also capable of supplying smaller thumbnails.

With respect to the display layer determined by the display layer determining section 260, the drawing section 280 draws as the image location display the places at which the image data are captured based on the location information for the image information stored in the cluster storage section 220.

In addition, when a map corresponding to that display layer is obtained by the map obtaining section 240, the drawing section 280 superposes that map with the image location display. Here, when the location name corresponding to that display layer is obtained by the map obtaining section 240, the drawing section 280 superposes that location name with the image location display. In other words, the drawing section 280 is equipped with an OSD (On-Screen Display) function, and superposes a location name obtained from the location name information database 700 with a map obtained from the map information database 800. As a result, it is possible to accommodate location names in multiple languages with ease.

It is noted that it would be effective to determine the font size used for the OSD display depending on the size of the display section 290. In addition, as the resolution for location names becomes finer, the capacity required for storing fonts becomes larger, and therefore, it is also effective to pre-define the resolution for location names depending on the estimated memory capacity of the system.

The display section 290 displays the image location display drawn by the drawing section 280, and like the display section 140, displays it on a monitor, such as an LCD.

Figure 3:
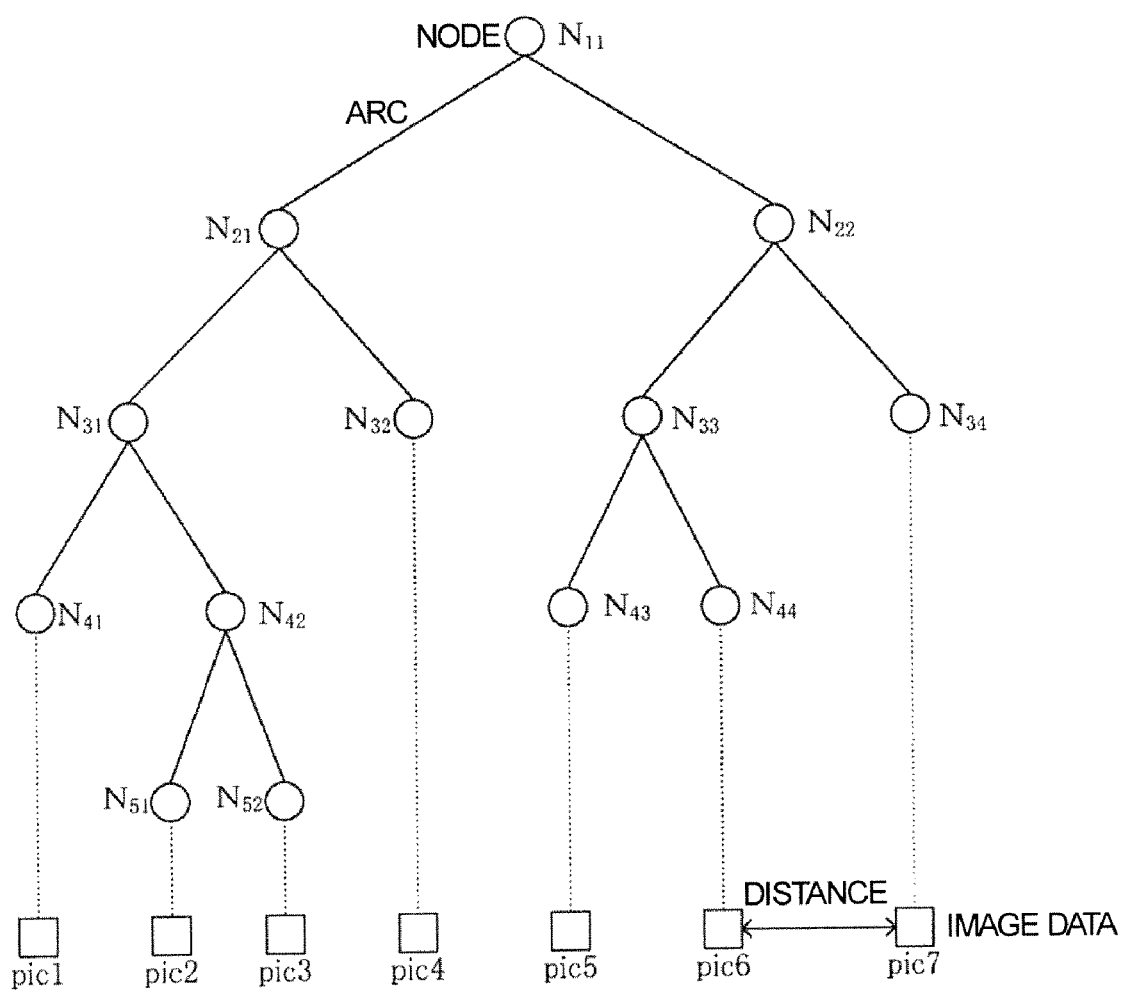
FIG. 3 is a diagram indicating one example of a cluster tree in an embodiment of the present invention.

FIG. 3 is a diagram indicating one example of a cluster tree in an embodiment of the present invention. In this example, a tree data structure in which nodes are hierarchically connected with arcs is adopted. Of nodes connected by an arc, the upper node is called a parent node, while the lower node is called a child node. In addition, of child nodes, the one on the left is called a left node, and the one on the right is called a right node.

In addition, in a cluster tree, the uppermost node, which is not connected to a parent node, is called a root node, and a node to which no child node is connected is called a leaf node or an end node.

In this example, to a root node $N_{11}$ are connected a node $N_{21}$ as a left node and a node $N_{22}$ as a right node. In addition, nodes $N_{31}$ and $N_{32}$ are connected to the node $N_{21}$ as a left node and a right node, respectively, and nodes $N_{33}$ and $N_{34}$ are connected to the node $N_{22}$ as a left node and a right node, respectively. In addition, nodes $N_{41}$ and $N_{42}$ are connected to the node $N_{31}$ as a left node and a right node, respectively, and nodes $N_{43}$ and $N_{44}$ are connected to the node $N_{33}$ as a left node and a right node, respectively. Further, nodes $N_{51}$ and $N_{52}$ are connected to the node $N_{42}$ as a left node and a right node, respectively.

Here, the nodes $N_{41}$, $N_{51}$, $N_{52}$, $N_{32}$, $N_{43}$, $N_{44}$ and $N_{34}$ are all end nodes, and they correspond to image data pic1 through pic7, respectively. In this cluster tree, the image data pic1 through pic7 are managed through hierarchical clusters like the ones described below.

Figure 4:
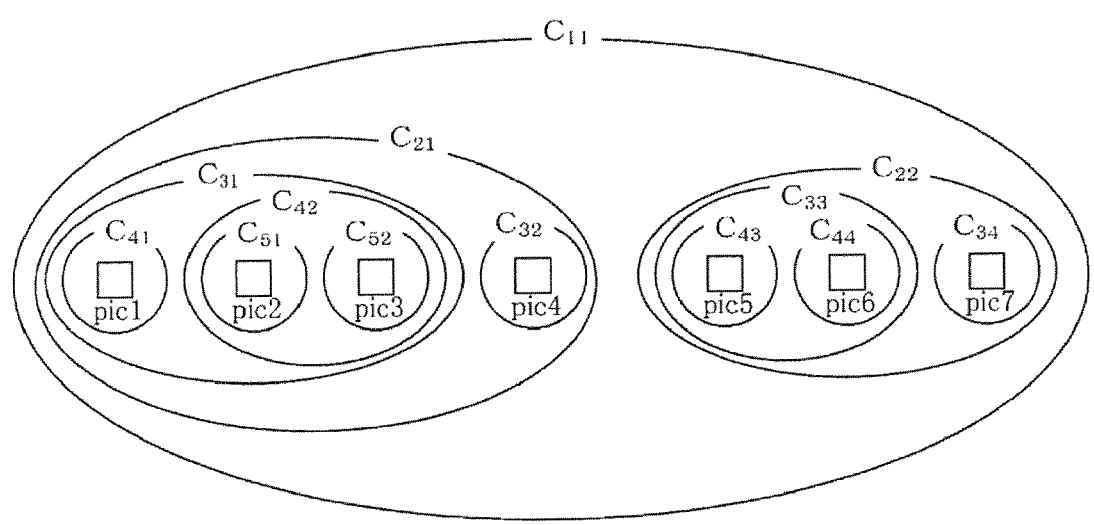
FIG. 4 is a diagram indicating one example of hierarchical clusters in an embodiment of the present invention.

FIG. 4 is a diagram indicating one example of hierarchical clusters in an embodiment of the present invention. This example shows hierarchical clusters that are realized by the cluster tree in FIG. 2, and the image data pic1 through pic7 are all included within cluster $C_{11}$ of the upper most layer. In these hierarchical clusters, the cluster $C_{11}$ includes clusters $C_{21}$ and $C_{22}$. In addition, the cluster $C_{21}$ includes clusters $C_{31}$ and $C_{32}$, and the cluster $C_{22}$ includes clusters $C_{33}$ and $C_{34}$. In addition, the cluster $C_{31}$ includes clusters $C_{41}$ and $C_{42}$, and the cluster $C_{33}$ includes clusters $C_{43}$ and $C_{44}$. Further, the cluster $C_{42}$ includes clusters $C_{51}$ and $C_{52}$.

Here, the clusters $C_{41}$, $C_{51}$, $C_{52}$, $C_{32}$, $C_{43}$, $C_{44}$ and $C_{34}$ do not include any other cluster within, and each correspond to image data pic1 through pic7, respectively. As a result, the image data pic1 through pic7 are managed through hierarchical clusters. For example, the image data pic2 is included in hierarchical clusters starting from the cluster $C_{11}$ of the uppermost layer followed by cluster $C_{21}$, cluster $C_{31}$, cluster $C_{42}$, and cluster $C_{51}$, in that order, and is thus managed.

Through such hierarchical clusters, image data that a relatively close to one another on some distance scale end up being included in the same cluster. Here, as a distance scale, the location information, in terms of latitude and longitude, of the places at which the image data are captured is used, for example. As a result, the image data are managed in such a manner that those whose places of capture are relatively close to one another are included in the same cluster, and the image data are organized in such a manner that when a new image data is added, it is appropriately placed within the hierarchical clusters.

Figure 5A:
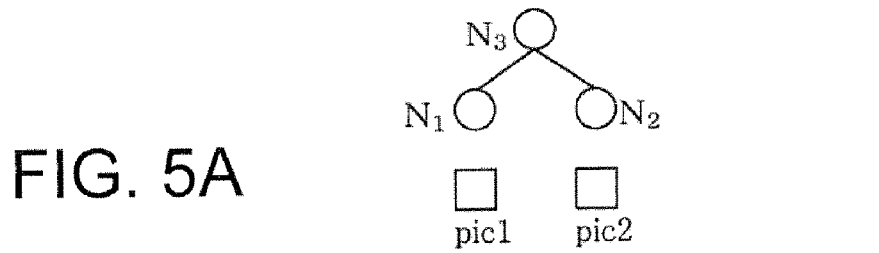
FIGS. 5A, 5B, 5C and 5D indicate one example in a case where a new cluster is added to hierarchical clusters in an embodiment of the present invention.

FIGS. 5A, 5B, 5C and 5D show one example in a case where a new cluster is added to hierarchical clusters in an embodiment of the present invention. Here, as a simple example, a state where two image data pic1 and pic2 are already stored in memory is taken to be the initial state. In other words, as shown in FIG. 5A, as child nodes of a given node $N_3$, it is assumed that there exist a left node $N_1$ corresponding to the image data pic1 and a right node $N_2$ corresponding to the image data pic2.

Figure 5B:
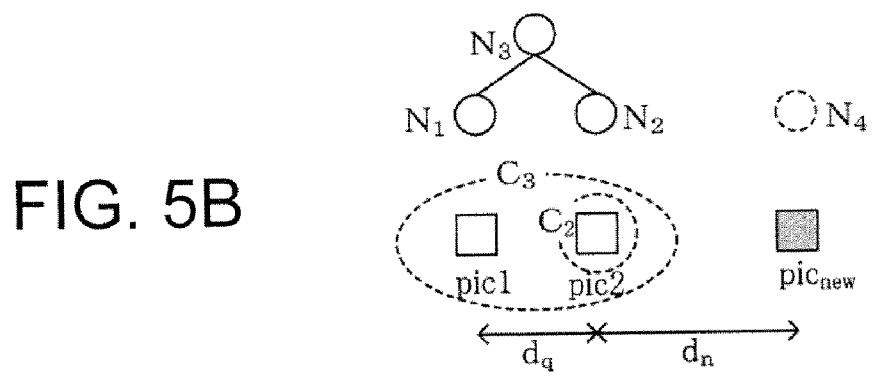
Figure 5C:
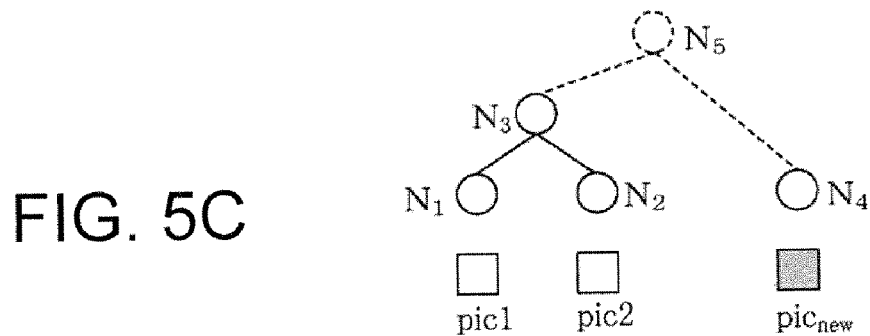

Here, as shown in FIG. 5B, when a focus node N4 corresponding to a new image data $pic_{new}$ is to be added, the image data pic1 and pic2, which are already clustered, and the new image data $pic_{new}$ are sorted in the order of, for example, their captured dates, and the position at which the new image data $pic_{new}$ is to be placed is thus detected.

Then, a cluster $C_3$, which is the largest cluster of the clusters adjacent to the new image data $pic_{new}$, and to which a proximal image data, whose distance is closest to the new image data $pic_{new}$, belongs, becomes a candidate cluster as a candidate to be a cluster to which the new image data $pic_{new}$ may belong. Here, the term proximal image data is used to refer to the image data that is, when sorted in the order of the date of capture, closest in its date of capture, and in this example, the image data pic2 corresponds thereto.

Then, a distance $d_n$ (additional distance) between the new image data $pic_{new}$ and the proximal image data pic2 is calculated, and the maximum distance value $d_q$ (maximum distance) between adjacent image data of all the image data belonging to the candidate cluster $C_3$ is also calculated. The maximum distance $d_q$ in this example is the distance between the image data pic1 and pic2.

As shown in FIG. 5B, when the additional distance $d_n$ is greater than the maximum distance $d_q$, the image data that belong to the candidate cluster $C_3$ remain as they are, and a new node $N_5$ is added above the node $N_3$ that constitutes the candidate cluster $C_3$. Then, with this node $N_5$ as a parent node, the focus node $N_4$ is added as a child node.

Figure 5D:
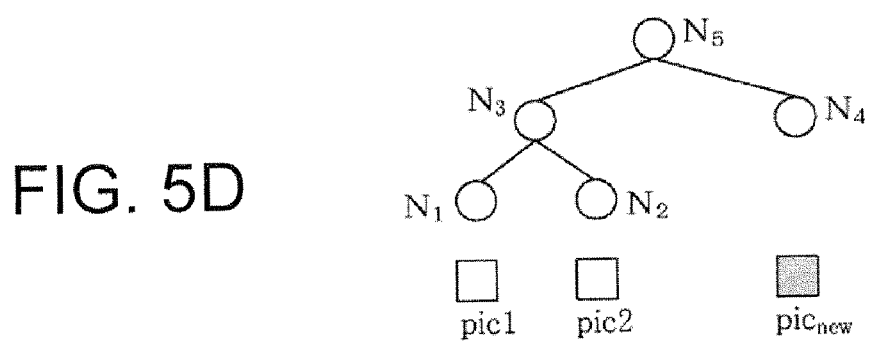

As a result, a cluster tree to which the focus node $N_4$ corresponding to the new image data $pic_{new}$ is newly added is eventually formed as shown in FIG. 5D. This indicates the fact that the distance between the image data pic1 and pic2 is relatively closer than the distance between the image data pic2 and $pic_{new}$.

Figure 6A:
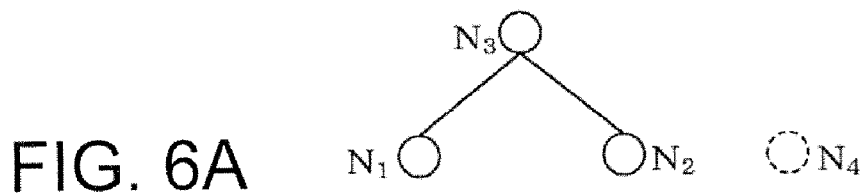
FIGS. 6A, 6B and 6C indicate another example of a case where a new cluster is added to hierarchical clusters in an embodiment of the present invention.
Figure 6B:
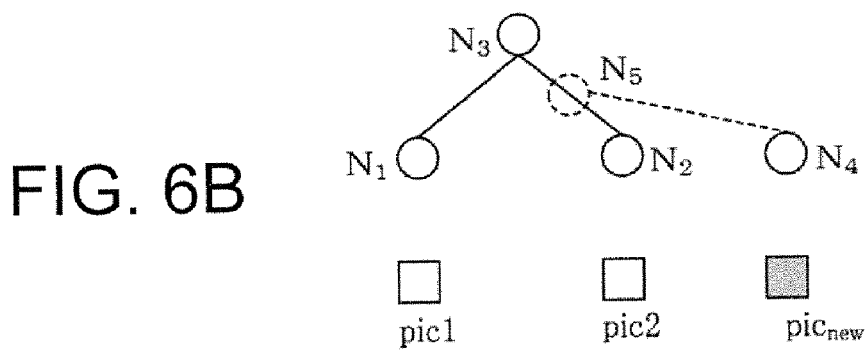
Figure 6C:
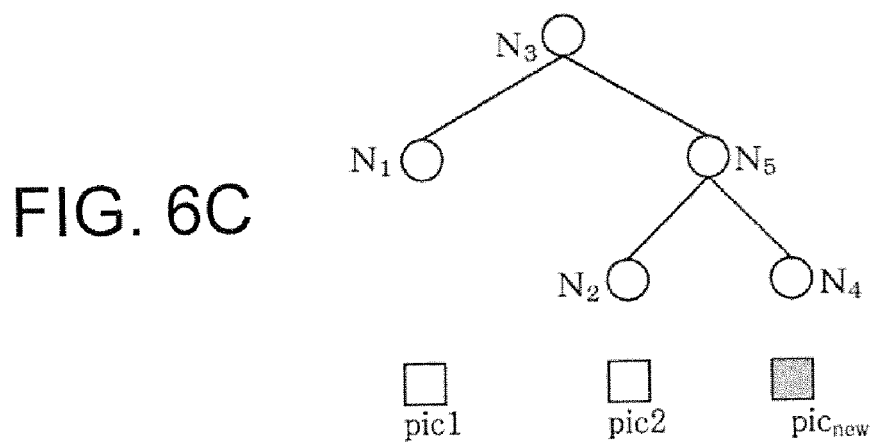

FIGS. 6A, 6B and 6C show another example in a case where a new cluster is added to hierarchical clusters in an embodiment of the present invention. Here, as in the example shown in FIGS. 5A through 5D, as a simple example, a state where two image data pic1 and pic2 are already stored in memory is taken to be the initial state.

After calculating the additional distance $d_n$ and the maximum distance $d_q$, if it is found that the additional distance $d_n$ is less than the maximum distance $d_q$ as shown in FIG. 6A, a new cluster is generated such that the new image data $pic_{new}$ and the proximal image data pic2 are included in the same cluster. In other words, as shown in FIG. 6B, a new node $N_5$ is newly added between the node $N_3$ constituting the candidate cluster $C_3$ and the node $N_2$ corresponding to the proximal image data pic2. Then, with this node $N_5$ as a parent node, the focus node $N_4$ is added as a child node.

As a result, a cluster tree to which the focus node $N_4$ corresponding to the new image data $pic_{new}$ is newly added is eventually formed as shown in FIG. 6C. This indicates the fact that the distance between the image data $pic_{new}$ and pic2 is relatively closer than the distance between the image data pic1 and pic2.

Figure 7:
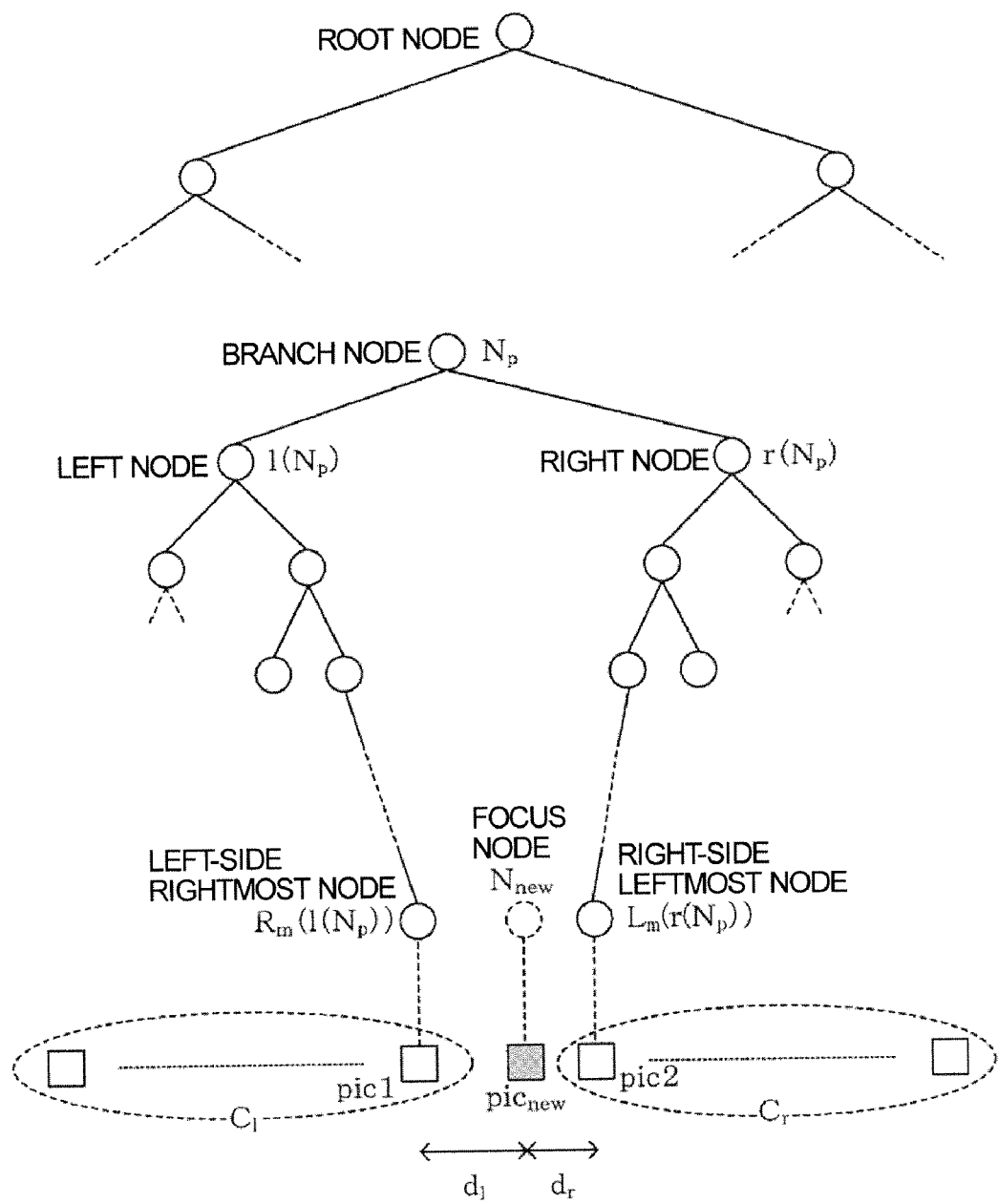
FIG. 7 is a diagram indicating a general example of a case where a new cluster is added to hierarchical clusters in an embodiment of the present invention.

FIG. 7 shows a general example of a case where a new cluster is added to hierarchical clusters in an embodiment of the present invention. Here, a node in a layer that is lower than the root node is set as a branch node $N_p$. In addition, "l ($N_p$)" represents a left node of the branch node $N_p$, and "r ($N_p$)" represents a right node of the branch node $N_p$.

The branch node $N_p$ is a node that has as a child node either a node corresponding to the largest cluster adjacent to the new image data $pic_{new}$ on the left or right side in terms of the order of their captured dates, for example, or a node corresponding to the largest cluster adjacent to the new image data $pic_{new}$ on the other side. Therefore, the largest cluster adjacent to the new image data $pic_{new}$ on the left side is a cluster $C_l$ corresponding to the left node l($N_p$) of the branch node $N_p$, and the largest cluster adjacent to the new image data $pic_{new}$ on the right side is a cluster Cr corresponding to the right node r ($N_p$) of the branch node $N_p$.

In addition, assuming that "$R_m(N)$" represents the rightmost leaf node of the nodes included in a given node N of the cluster tree, and "$L_m(N)$" represents the leftmost leaf node, the rightmost leaf node of the nodes included in the left node l($N_p$) (the rightmost node on the left side) of the branch node $N_p$ may be represented as "$R_m(l(N_p))$", and the leftmost leaf node included in the right node r($N_p$) (the leftmost node on the right side) of the branch node $N_p$ may be represented as "$L_m(r(N_p))$".

Here, a distance dl between the new image data $pic_{new}$ and the image data pic1 corresponding to the left side rightmost node $R_m(l(N_p))$, and a distance $d_r$ between the new image data $pic_{new}$ and the image data pic2 corresponding to the right side leftmost node $L_m(r(N_p))$ are calculated. If as a result the distance $d_r$ is shorter, the right node r($N_p$) of the branch node $N_p$ becomes a candidate node $N_q$, whereas if the distance dl is shorter, the left node l($N_p$) of the branch node $N_p$ becomes the candidate node $N_q$.

Then, the additional distance $d_n$ and the maximum distance $d_q$ are calculated with respect to this candidate node $N_q$. If as a result the maximum distance $d_q$ is shorter than the additional distance $d_n$, a node $N_{in}$ is inserted between the branch node $N_p$ and the candidate node $N_q$. A child node who has this node $N_{in}$ as a parent node is placed as a focus node $N_{new}$. On the other hand, if the additional distance $d_n$ is shorter than the maximum distance $d_q$, in order to further search a lower layer, a candidate node $N_q$ is set as a new branch node $N_p$, while at the same time setting the side of the candidate node $N_q$ that is closer to the focus node $N_{new}$ as a new candidate node $N_q$, and then recursively executing a process of comparing the additional distance $d_n$ and the maximum distance $d_q$, much like the one described above.

Thus, eventually, the focus node $N_{new}$ is placed. However, if such a recursive process is performed in its entirety from the uppermost layer, there is a risk that the amount of calculations required for the process would be excessive. As such, in an embodiment of the present invention, as will be described below, a predetermined number of upper layers in hierarchical clusters are fixed, and management is carried out in such a manner that a new node can only be added to layers below those predetermined layers.

Figure 8:
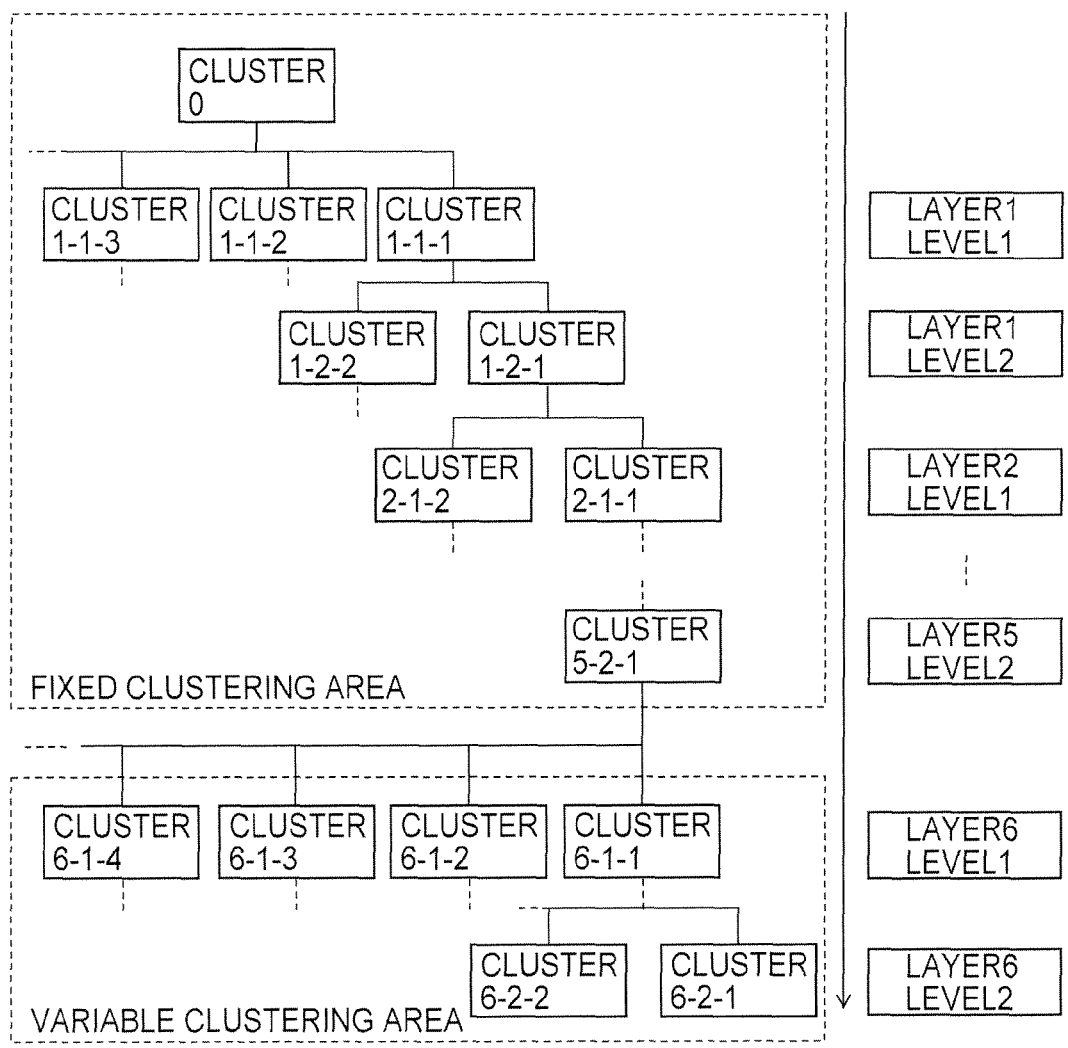
FIG. 8 is a diagram indicating one example of a hierarchical cluster structure in an embodiment of the present invention.

FIG. 8 is a diagram indicating one example of a hierarchical cluster structure in an embodiment of the present invention. Here, there are six layers, each having two levels, and it is assumed that this structure includes a plurality of layers beginning with level 1 of layer 1, and on to level 2 of layer 1, level 1 of layer 2 . . . level 2 of layer 5, level 1 of layer 6 and level 2 of layer 6, in this order. In other words, if cluster 0 of the uppermost layer is to be included, this cluster configuration would have a total of thirteen layers.

In this hierarchical cluster structure, level 1 of layer 1 down to level 2 of layer 5 are fixed clusters, and the structure of these clusters cannot be altered. In other words, new image data can only be added to level 1 of layer 6 or to level 2 of layer 6. Therefore, as described with reference to FIG. 7, in inserting a focus node, an initial value of the branch node is set at the uppermost layer in layer 6, and with this as a reference point, an appropriate node insertion position is determined by tracing the layers downward.

It is noted that although the cluster tree is here depicted as a multiway cluster tree, it is essentially comparable to the binary cluster tree shown in FIG. 3. In implementation, it can further be realized with multiple hierarchical clusters for each cluster.

Through such hierarchical clusters, part of whom is fixed, the insertion of a new node, in other words the addition of new image data, becomes easier, and the processing that accompanies cluster management can be made faster.

Figure 9:
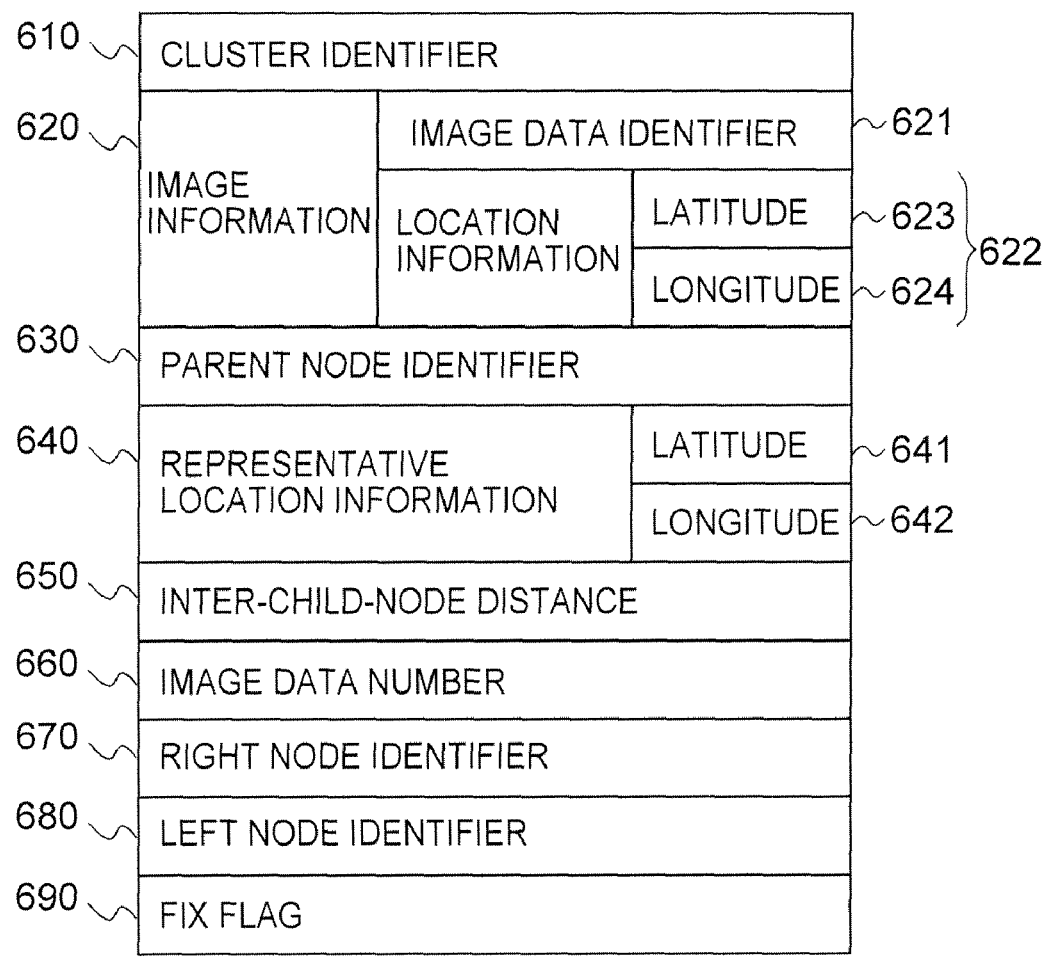
FIG. 9 is a diagram indicating one example of the data structure of each node of hierarchical clusters in an embodiment of the present invention.

FIG. 9 is a diagram indicating one example of the data structure of each node of hierarchical clusters in an embodiment of the present invention. In this data structure, there are included a cluster identifier 610, image information 620, a parent node identifier 630, representative location information 640, an inter-child-node distance 650, an image data number 660, a right node identifier 670, a left node identifier 680, and a fix flag 690.

The cluster identifier 610 is an identifier for uniquely identifying the cluster corresponding to that node. The image information 620 retains, if that node is an end node, information regarding the corresponding image data, and includes an image data identifier 621 and location information 622. Here, the image data identifier 621 is an identifier for uniquely identifying an image data stored in the image storage section 210, and file names, for example, may be used for this purpose. In addition, the location information 622 indicates the latitude 623 and longitude 624 of the place at which the image data is captured.

The parent node identifier 630 indicates the cluster identifier 610 corresponding to the parent node of that node. The representative location information 640 indicates the location information representative of the cluster corresponding to that node, and is utilized by the application when appropriate. For example, this representative location information 640 may be utilized in performing the location display for an image data at a specific position on a map.

The inter-child-node distance 650 indicates the distance between two child nodes of that node. The image data number 660 indicates the number of image data included in the cluster corresponding to that node.

The right node identifier 670 indicates the cluster identifier 610 corresponding to the child node of that node on the right side, and the left node identifier 680 indicates the cluster identifier 610 corresponding to the child node of that node on the left side.

The fix flag 690 indicates the property as to whether or not the structure of the cluster corresponding to that node is fixed. As described above, in this embodiment of the present invention, the cluster structure is fixed up to level 2 of layer 5, and the cluster structure of the layers below that is variable. However, even if a cluster initially has a variable structure, there are cases where one would want to fix the structure thereof once certain conditions are satisfied. For example, if the number of image data belonging to a given cluster exceeds a predetermined number and further adding image data would upset the balance of the cluster structure, it would be effective to have that cluster fixed. As such, even if the cluster is initially of a variable structure, by setting this fix flag 690 so that the cluster would take on a fixed property, it is possible to fix the cluster structure thereof.

Figure 10:
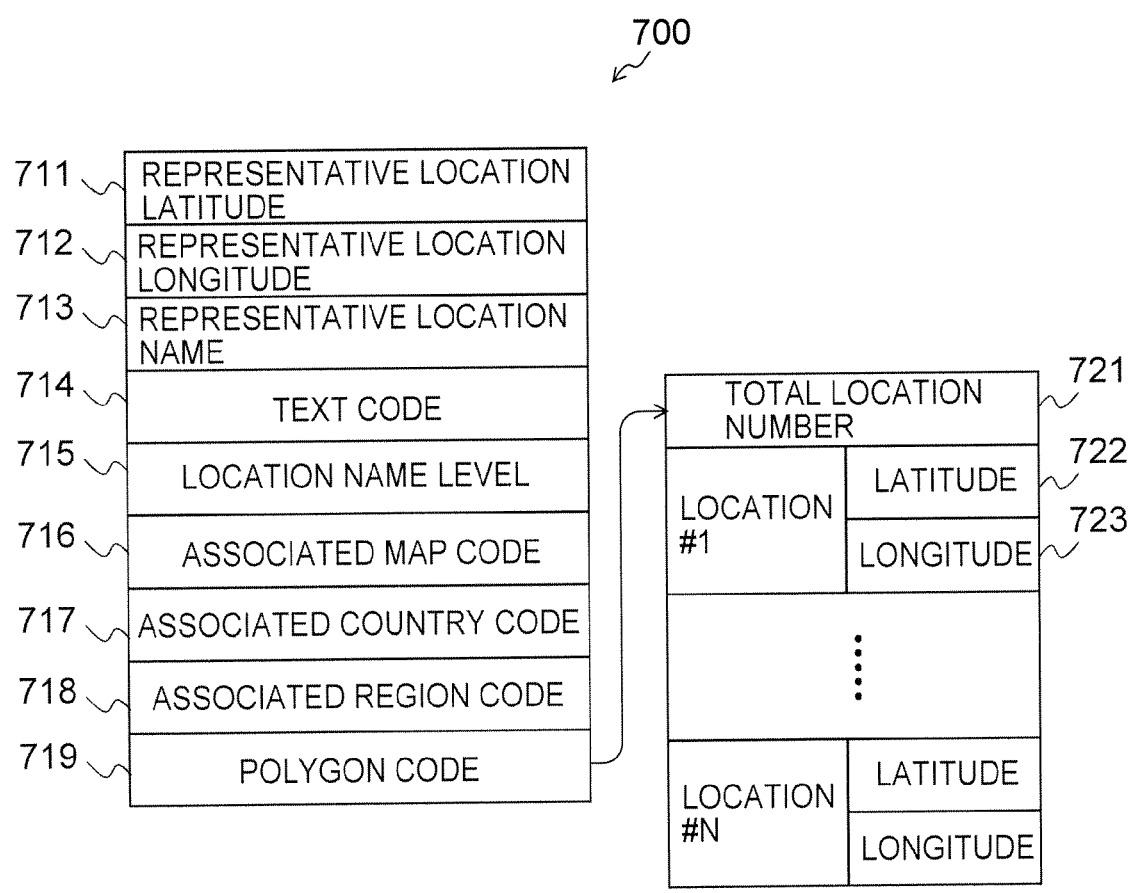
FIG. 10 is a diagram indicating one example of the data structure of a location name information database 700 in an embodiment of the present invention.

FIG. 10 is a diagram indicating one example of the data structure of the location name information database 700 in an embodiment of the present invention. This location name information database 700 retains location name information for each area, and specifically includes a representative location latitude 711, a representative location longitude 712, a representative location name 713, a text code 714, a location name level 715, an associated map code 716, an associated country code 717, an associated region code 718, and a polygon code 719.

The representative location latitude 711 and the representative location longitude 712 indicate the latitude and longitude, respectively, of the representative location for that area. The representative location name 713 indicates the location name of the location representative of that area. The text code 714 indicates the text code (such as shift JIS code and the like) for the representative location name 713. This text code 714 is utilized so as to accommodate multiple languages. The location name level 715 indicates the level of detail of the representative location name 713 be it a prefecture level, a city level, a town level, and so forth, for example.

The associated map code 716 indicates the code for the map to which that area belongs. The associated country code 717 indicates the code for the country to which that area belongs. In addition, the associated region code 718 indicates the code for the region to which that area belongs.

The polygon code 719 indicates a link to a polygon group that defines that area. This polygon group includes an N number of locations, where N is an integer. Each location is defined by a latitude 722 and a longitude 723. In addition, a total location number 721 indicates the number of locations (N).

By comparing the latitude and longitude provided by the map obtaining section 240 with the latitude 722 and the longitude 723 of each location, the location name information database 700 determines which area the location belongs to, and supplies the location name information for the relevant area to the map obtaining section 240.

Figure 11:
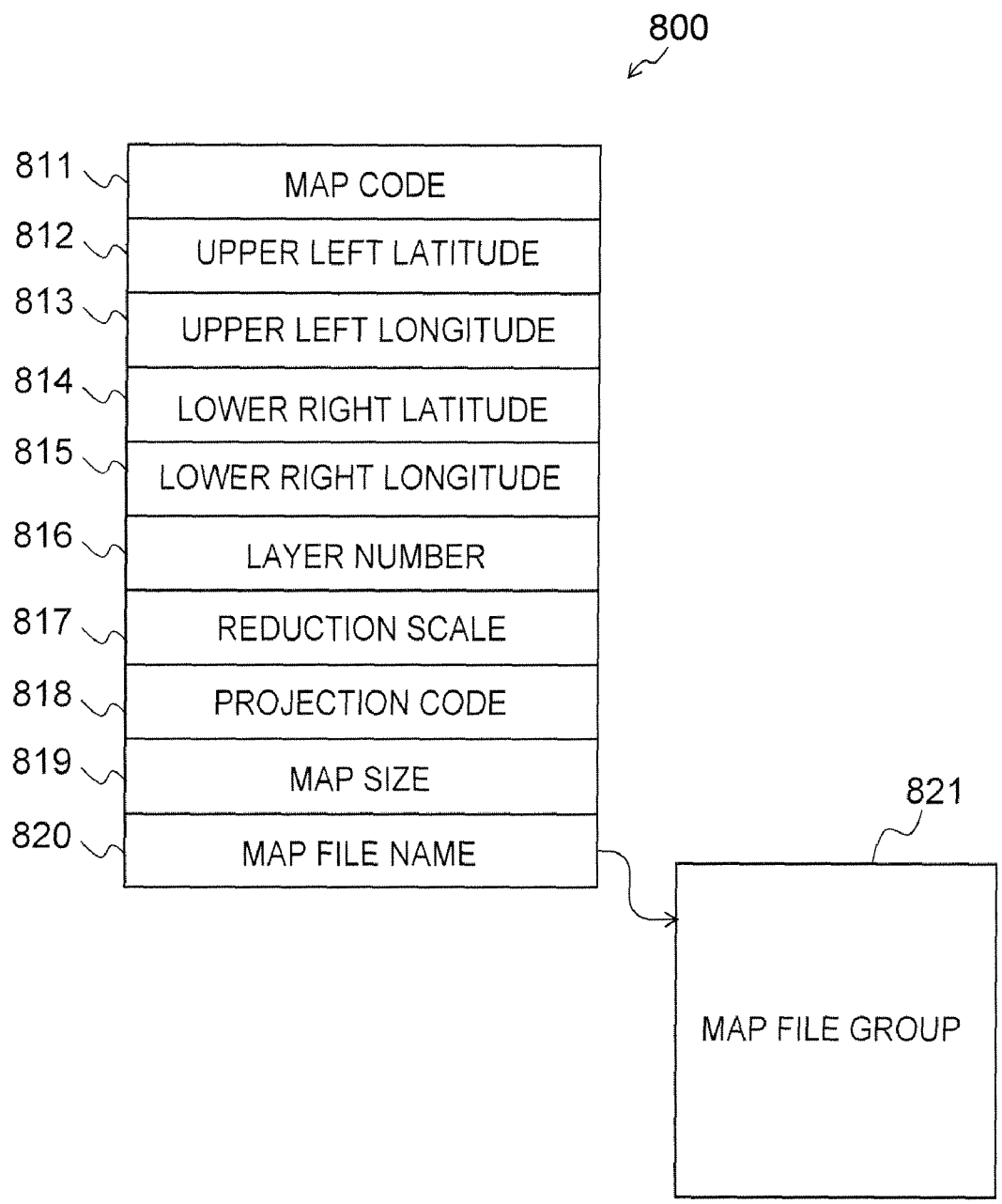
FIG. 11 is a diagram indicating one example of the data structure of a map information database 800 in an embodiment of the present invention.

FIG. 11 is a diagram indicating one example of the data structure of the map information database 800 in an embodiment of the present invention. This map information database 800 includes, as map information, a map code 811, an upper left latitude 812, and upper left longitude 813, a lower right latitude 814, a lower right longitude 815, a layer number 816, a reduction scale 817, a projection code 818, a map size 819 and a map file name 820.

In addition, the map information database 800 includes a map file group 821 that includes the contents of the maps. Here, if we were to assume that the maps were raster maps, the map files might be, for example, GIF (Graphic Interchange Format) files. Since GIF files are smaller in size and allow for clearer outlines, they are suitable for simplified maps that have a lot of lines.

Of the map information, the map code 811 indicates a code for uniquely identifying the corresponding map. The upper left latitude 812 and the upper left longitude 813 indicate the latitude and longitude, respectively, at the upper left corner of the corresponding map. In addition, the lower right latitude 814 and the lower right longitude 815 indicate the latitude and the longitude, respectively, at the lower right corner of the corresponding map. Thus, by indicating the latitudes and longitudes at the upper left corner and the lower right corner, it is possible to determine whether or not the target latitude and longitude are included in that map.

The layer number 816 indicates the layer of a map, which is described above with reference to FIG. 8. The reduction scale 817 indicates the extent of reduction of a given map. The projection code 818 is a code for identifying the method of projection for a given map. Examples of projection methods might include, for example, Mercator projection, azimuth equidistant projection, and the like. The drawing section 280 in FIG. 2 identifies the projection method from this projection code 818, and draws after performing coordinate transformation.

The map size 819 indicates the size of a map by, for example, indicating the number of pixels. The map file 820 indicates a file name for identifying a map in the map file group 821.

Figure 12:
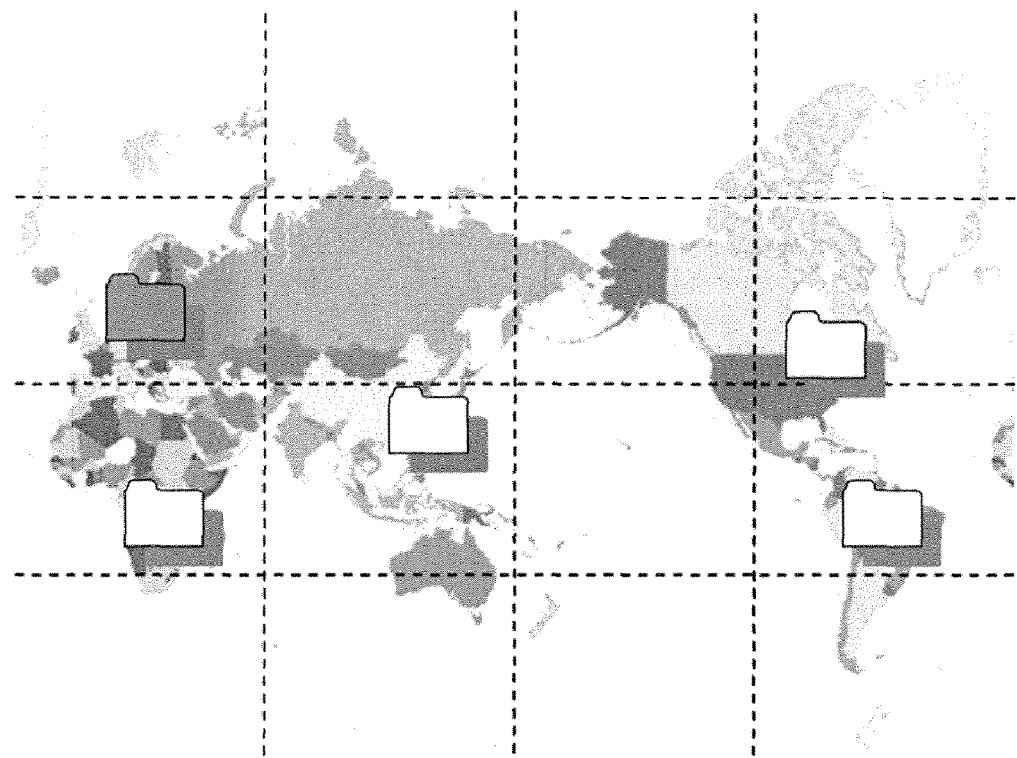
FIG. 12 is a diagram indicating an example of a world map at the uppermost layer in an embodiment of the present invention.

FIG. 12 is a diagram indicating an example of a world map at the uppermost layer in an embodiment of the present invention. This world map is a map that corresponds to layer 1. In this embodiment of the present invention, since the upper layers are assumed to have a fixed cluster structure, the displayed location of the image location display indicating the places at which image data are captured is also fixed at a predetermined position.

Here, the entire world map is divided into a four-by-four mesh of sixteen sections, and fixed clusters are formed based on this mesh. If an image data exists within a given section, a symbol is drawn at a predetermined position in that section. A folder icon, for example, may be used as such a symbol.

In other words, in this world map, instead of displaying the exact location reflecting the latitude and longitude of the image data, an approximate location is displayed by indicating which of the sixteen sections the image data belongs to. For example, in the example of FIG. 12, regardless of whether images are captured in Tokyo, in northern Australia, or in India, a folder icon would be displayed at southern Japan as a location representing that section. Such a fixed display may be used not only for the world map at the uppermost layer, but also with respect to the layers below. As a result, management of image data through fixed clusters can be realized with ease.

Figure 13A:
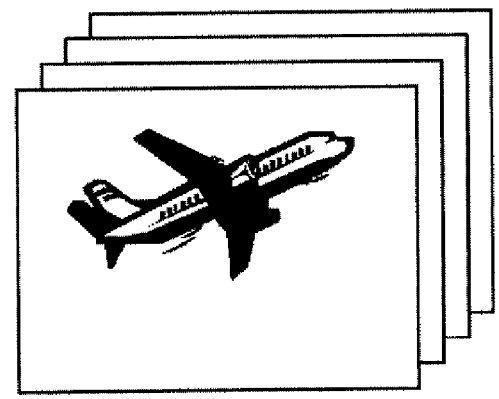
FIGS. 13A, 13B and 13C are diagrams indicating variations of symbols for image location display in an embodiment of the present invention.
Figure 13B:
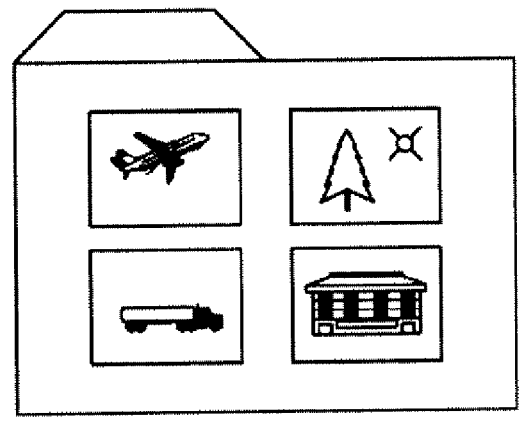
Figure 13C:
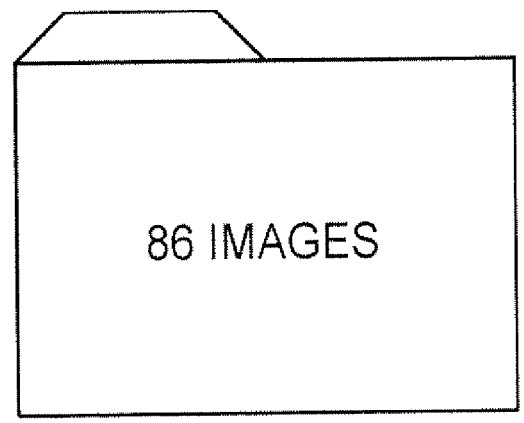

FIGS. 13A, 13B and 13C are diagrams indicating variations of the symbols for the image location display in an embodiment of the present invention. For the image location display, a variety of symbols may be used in order to indicate that corresponding image data exist. For example, instead of a simple folder icon, as was shown in FIG. 12, a series of thumbnails may be placed on top of one another and displayed as shown in FIG. 13A. Or thumbnails may be displayed inside the folder icon as shown in FIG. 13B. Further, the number of corresponding image data may be displayed inside the folder icon as shown in FIG. 13C.

Figure 14A:
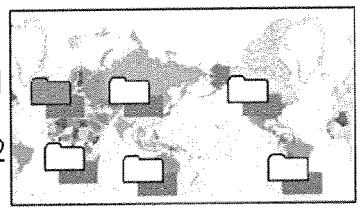
FIGS. 14A through 14F are diagrams indicating examples of maps at each layer in an embodiment of the present invention.

FIGS. 14A through 14F are diagrams indicating maps for each layer in an embodiment of the present invention. The world map of layer 1 shown in FIG. 14A is the map of the uppermost layer described with reference to FIG. 12, and the entire world is displayed.

Figure 14B:
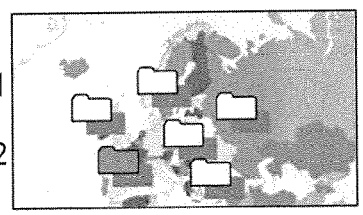
Figure 14C:
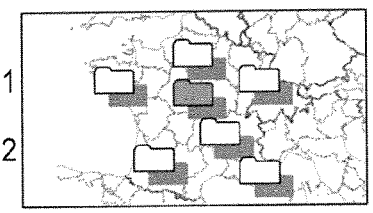
Figure 14D:
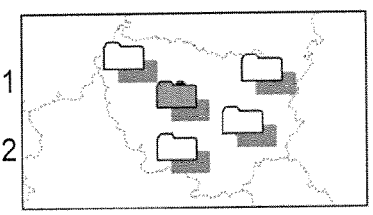
Figure 14E:
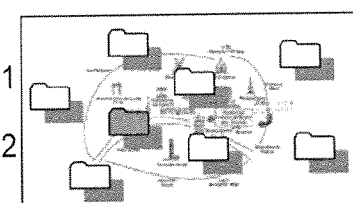

At the layers below the world map of layer 1, there are provided world area maps at layer 2 as shown in FIG. 14B, country maps at layer 3 as shown in FIG. 14C, regional maps at layer 4 as shown in FIG. 14D, and city outline maps at layer 5 as shown in FIG. 14E. With respect to these maps, too, by performing the fixed display described above, it is possible to realize management of image data through fixed clusters with ease.

Figure 14F:
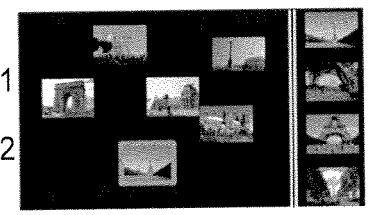

FIG. 14F shows a detailed city map, but the background map is not displayed. When a relevant map does not exist in the map information database 800, the background map, as shown in FIG. 14F, cannot be displayed. In such a case, based on the location information of the image data, thumbnails are displayed at relative positions. As a result, even if the background map cannot be displayed, the places at which the image data are captured are displayed in such a manner that their positional relationship is reflected.

Each of these maps from layer 1 to layer 6 is shifted to and from another map by way of user operation. If an enlargement operation is performed while the world map of layer 1 is displayed, the display is enlarged, and the world area map of layer 2 is displayed. If an enlargement operation is further repeated, the display is again enlarged, and the country map of layer 3 is displayed. And if enlargement is thus repeated, and an enlargement operation is inputted while the city outline map of layer 5 is being displayed, the detailed city map of layer 6 is displayed.

On the other hand, if a reduction operation is inputted while the detailed city map of layer 6 is being displayed, the display is reduced in scale, and the city outline map of layer 5 is displayed. If a reduction operation is further repeated, the display is again reduced in scale, and the regional map of layer 4 is displayed. And if reduction is thus repeated, and a reduction operation is inputted while the world area map of layer 2 is being displayed, the world map of layer 1 is displayed.

Figure 15A:
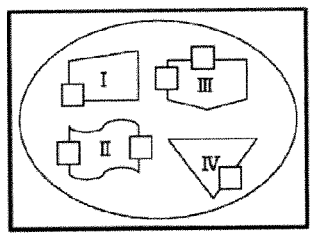
FIGS. 15A and 15B are diagrams indicating examples of levels within a layer in an embodiment of the present invention.
Figure 15B:
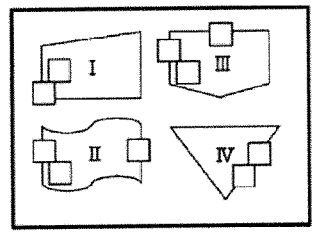

FIGS. 15A and 15B are diagrams indicating examples of the level within a layer in an embodiment of the present invention. Here, with the world map of layer 1 as an example, there are shown a display example of level 1 (FIG. 15A) and a display example of level 2 (FIG. 15B).

Within the same layer, level 1 is higher in the hierarchy than level 2. In other words, if an enlargement operation is inputted while the world map of level 1 of layer 1 is being displayed, the displayed content is enlarged, and the world map of level 2 of layer 1 will be displayed. On the other hand, when a reduction operation is inputted while the world map of level 2 of layer 1 is being displayed, the displayed content is reduced in scale, and the world map of the level 1 of layer 1 will be displayed.

In this example, six folder icons are displayed with respect to the world map of level 1 of layer 1, and ten folder icons are displayed with respect to the world map of level 2 of layer 1 which is an enlargement of the world map of level 1 of layer 1. In other words, even after an enlargement operation is inputted at level 1, the same map is used as the background, but the displayed content is enlarged, and more detailed contents are displayed. Conversely, even after a reduction operation is inputted at level 2, the same map is used as the background, but the displayed content is reduced, and more brief and abstracted contents are displayed.

Figure 16:
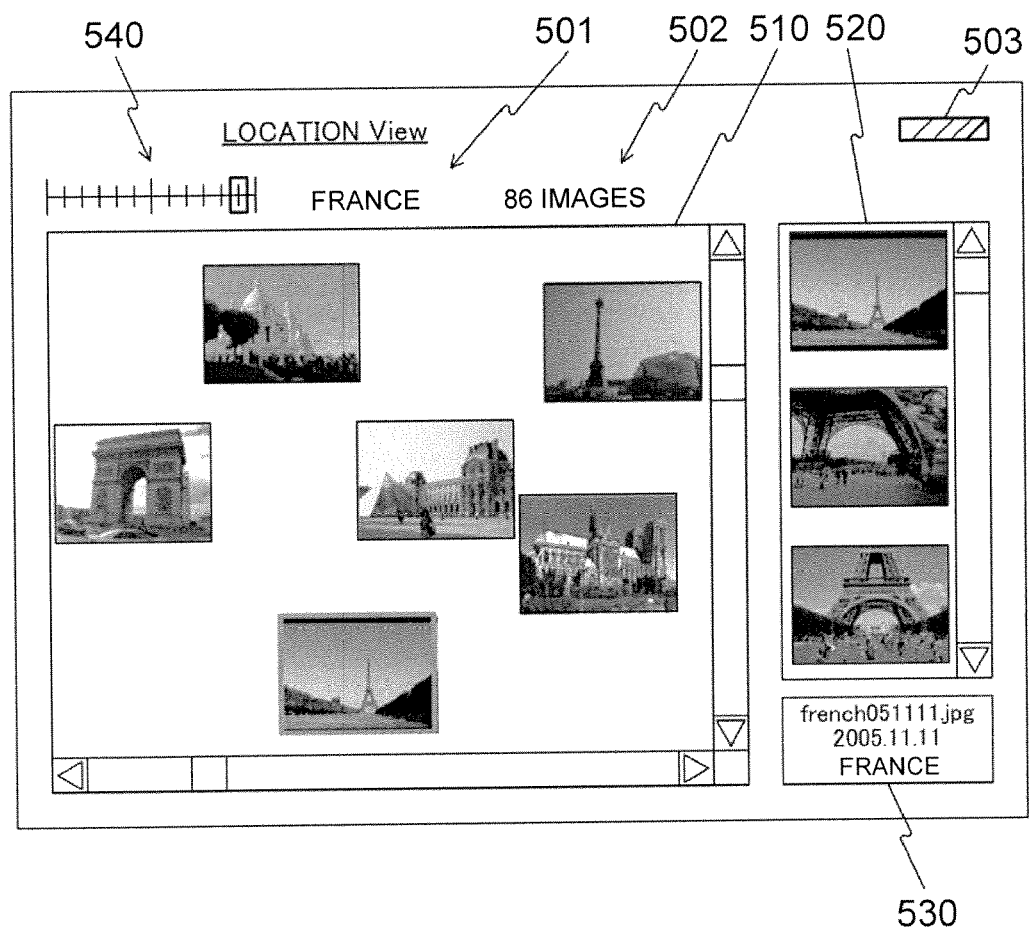
FIG. 16 is a diagram indicating one display example by an application in an embodiment of the present invention.

FIG. 16 is a diagram indicating one example of a display by an application in an embodiment of the present invention. In this display example, there are indicated a window 510 that performs image location display, and a window 520 that displays thumbnails. As a detailed city map of layer 6, the places at which image data are captured are shown at relative positions within the window 510. It may be so arranged that when an icon is selected in this window 510, the selected icon is displayed in the center. In addition, if there exists a corresponding map, that map may be displayed in this window 510.

In addition, thumbnails corresponding to the icon selected in the window 510 are displayed within the window 520. In addition, file information 530 for the image data corresponding to the thumbnail selected in the window 520 is displayed in the lower part of the window 520.

At the upper left part of this display example, there is displayed an enlargement/reduction bar 540, from which one is able to see the current enlargement scale. By sliding this enlargement/reduction bar 540, an enlargement or reduction operation can be inputted. When an enlargement operation is performed while a map is being displayed in the window 510, the map is enlarged, and once the enlargement ratio exceeds a certain range, the map is changed to the next layer, and the arrangement of the icons is also updated. Conversely, in order to return to a previous layer, a reduction operation is performed.

It is noted that other displayed information may include a representative location name 501 for the displayed map, a number 502 of the image data that are subject to displaying, remaining battery charge 503, and the like.

Figure 17:
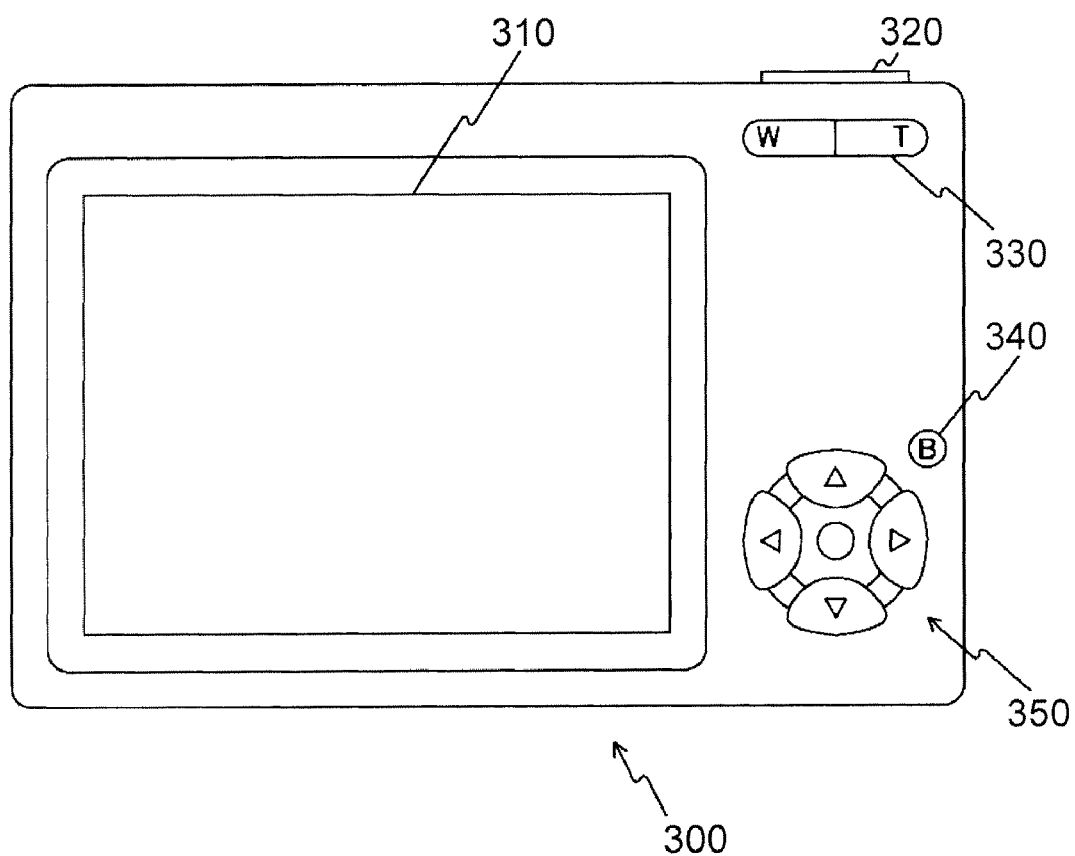
FIG. 17 is an external view of a digital still camera 300 as an example of the imaging apparatus 100 and the image display apparatus 200 in an embodiment of the present invention.

FIG. 17 is an exemplary external view of a digital still camera 300 as a concrete example of the imaging apparatus 100 and of the image display apparatus 200 in an embodiment of the present invention. On an operating surface of this digital still camera 300, there are provided a display 310 that displays a captured image, a zoom button 330 that accepts zooming operations of enlargement and reduction, a back button 340 for going back to a previous screen display, directional buttons 350 that accept directional command operations with respect to the display 310. In addition, on the upper surface of this digital still camera 300 is provided a shutter button 320 that accepts record commands for captured images.

By pressing the telescope (T) side of the zoom button 330, the user commands an enlargement operation, and by pressing the wide (W) side of the zoom button 330, the user commands a reduction operation. These operations are applicable not only during image capture, but also in performing image location display on the display 310.

In addition, in selecting folders or thumbnails in the window 510 or the window 520 during image location display, the user may make use of the directional buttons 350. Further, when returning from the window 520 to the window 510, the user may use the back button 340.

It is noted that although a method of manipulating the image location display through the zoom button 330 and the directional buttons 350 is described above, the present invention is by no means limited thereto, and instead, if the display 310 is touch sensitive, the image location display may be manipulated by directly inputting commands on the display 310.

Next, operations of the image display apparatus 200 in an embodiment of the present invention will be described with reference to the drawings.

Figure 18:
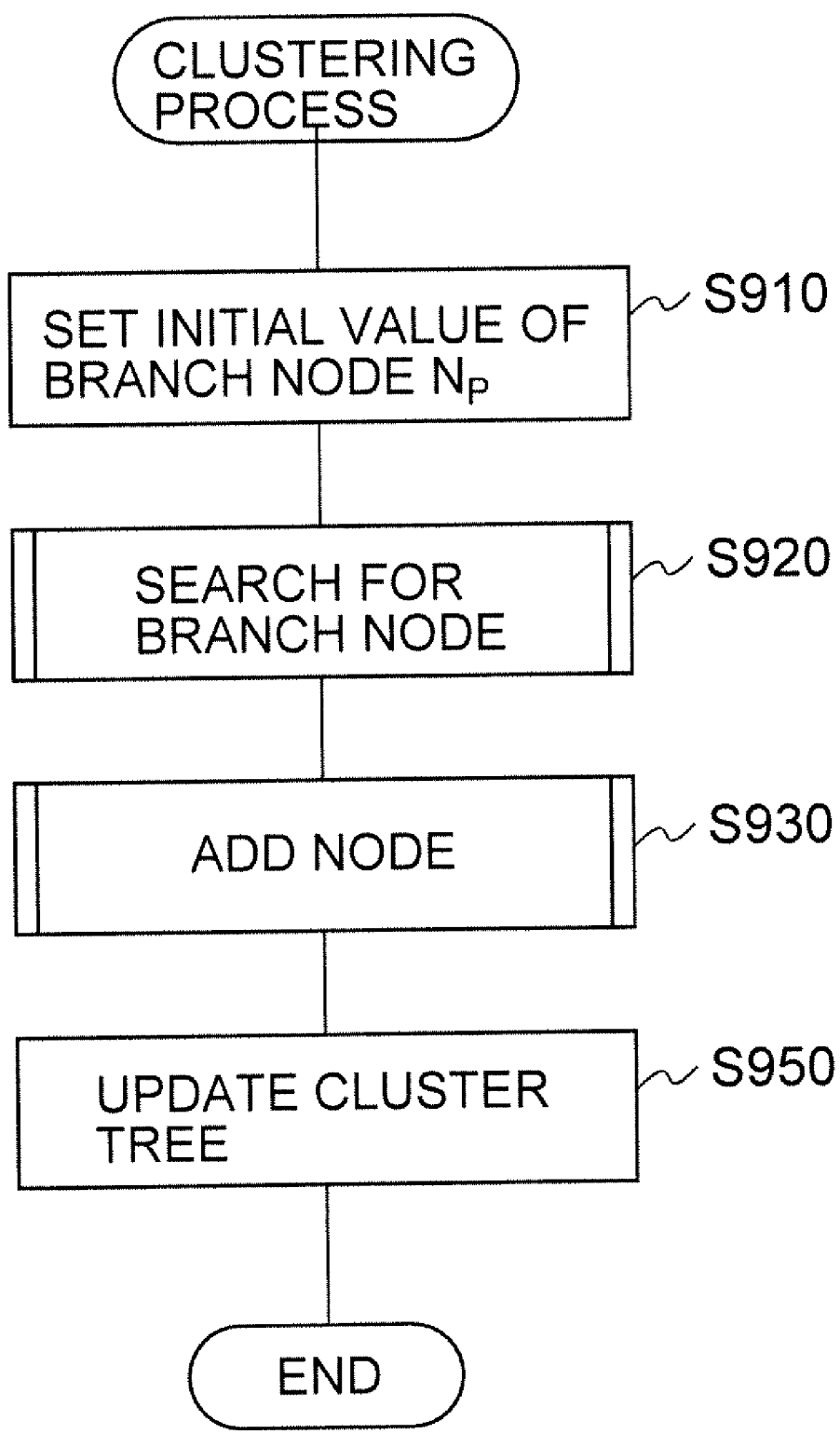
FIG. 18 is a flow chart indicating an example of a sequence of steps in a clustering process in an embodiment of the present invention.

FIG. 18 is a flow chart indicating an example of the procedures of a clustering process in an embodiment of the present invention. When adding a focus node $N_{new}$ corresponding to a new image data $pic_{new}$, if it is assumed that layers 1 through 5 are fixed clusters, then the uppermost node in layer 6 is provisionally set as the initial value of a branch node $N_p$ (step S910). Here, the node that is close in distance to the location information of the new image data $pic_{new}$ is selected as the initial value of the branch node $N_p$. However, if the fix flag 690 of that node indicates a fixed property, that node will not be selected as the initial value of the branch node $N_p$.

Then, by tracing downward from the provisionally set branch node $N_p$, a search for the branch node $N_p$ is performed (step S920). Then, with the branch node $N_p$ thus confirmed as the center, the place where a parent node $N_{in}$ of the focus node $N_{new}$ is to be added is searched for (step S930), and the cluster tree is updated by having this parent node $N_{in}$ added (step S950).

Figure 19:
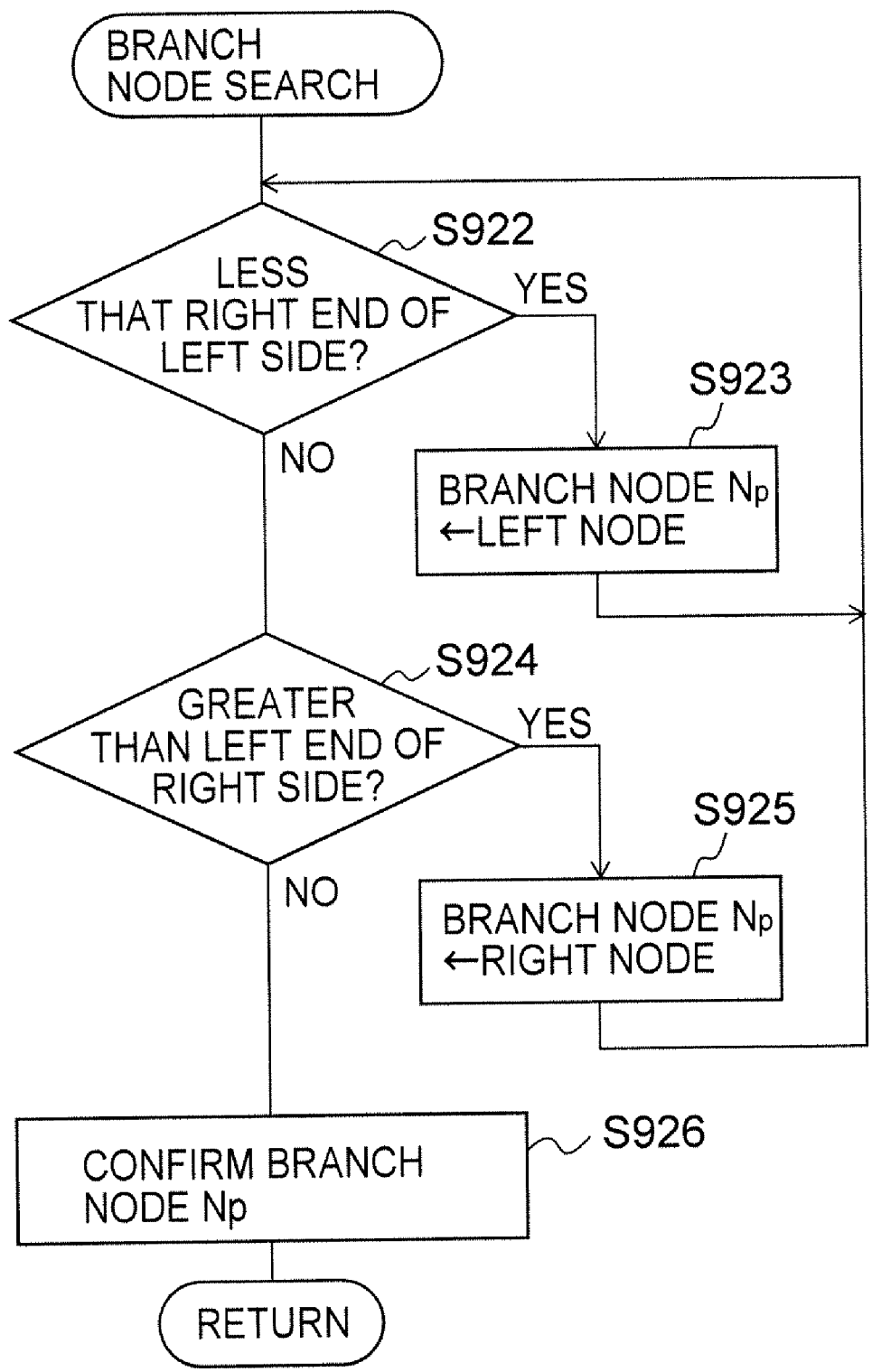
FIG. 19 is a flow chart indicating an example of a sequence of steps in a branch node search process (step S920) in an embodiment of the present invention.

FIG. 19 is a flow chart indicating an example of the procedures of the branch node search process (step S920) in an embodiment of the present invention. With reference to FIG. 7, if the new image data $pic_{new}$ is less than, in terms of the order of the date of capture, for example, the left side rightmost node ($R_m(l(N_p))$) of the cluster $C_1$ that is adjacent to the new image data $pic_{new}$ on its left side (step S922), the branch node $N_p$ is updated as the left node $l(N_p)$ (step S923). In other words, since it has thus been discovered that the focus node $N_{new}$ should exist to the left of the left side rightmost node $R_m(l(N_p))$, the branch node $N_p$ will be traced towards the left node $l(N_p)$.

On the other hand, if the new image data $pic_{new}$ is greater than, in terms of the order of the date of capture, for example, the right side leftmost node ($L_m(r(N_p))$) of the cluster $C_r$ that is adjacent to the new image data $pic_{new}$ on its right side (step S924), the branch node $N_p$ is updated as the right node $r(N_p)$ (step S925). In other words, since it has thus been discovered that the focus node $N_{new}$ should exist to the right of the right side leftmost node $L_m(r(N_p))$, the branch node $N_p$ will be traced towards the right node $r(N_p)$.

By repeating such a process of tracing the branch node $N_p$, once the new image data $pic_{new}$ reaches a place where, in terms of the order of the date of capture, for example, it is neither less than the left side rightmost node $R_m(l.(N_p))$ nor greater than the right side leftmost node $L_m(r(N_p))$, the branch node $N_p$ is confirmed (step S926).

Figure 20:
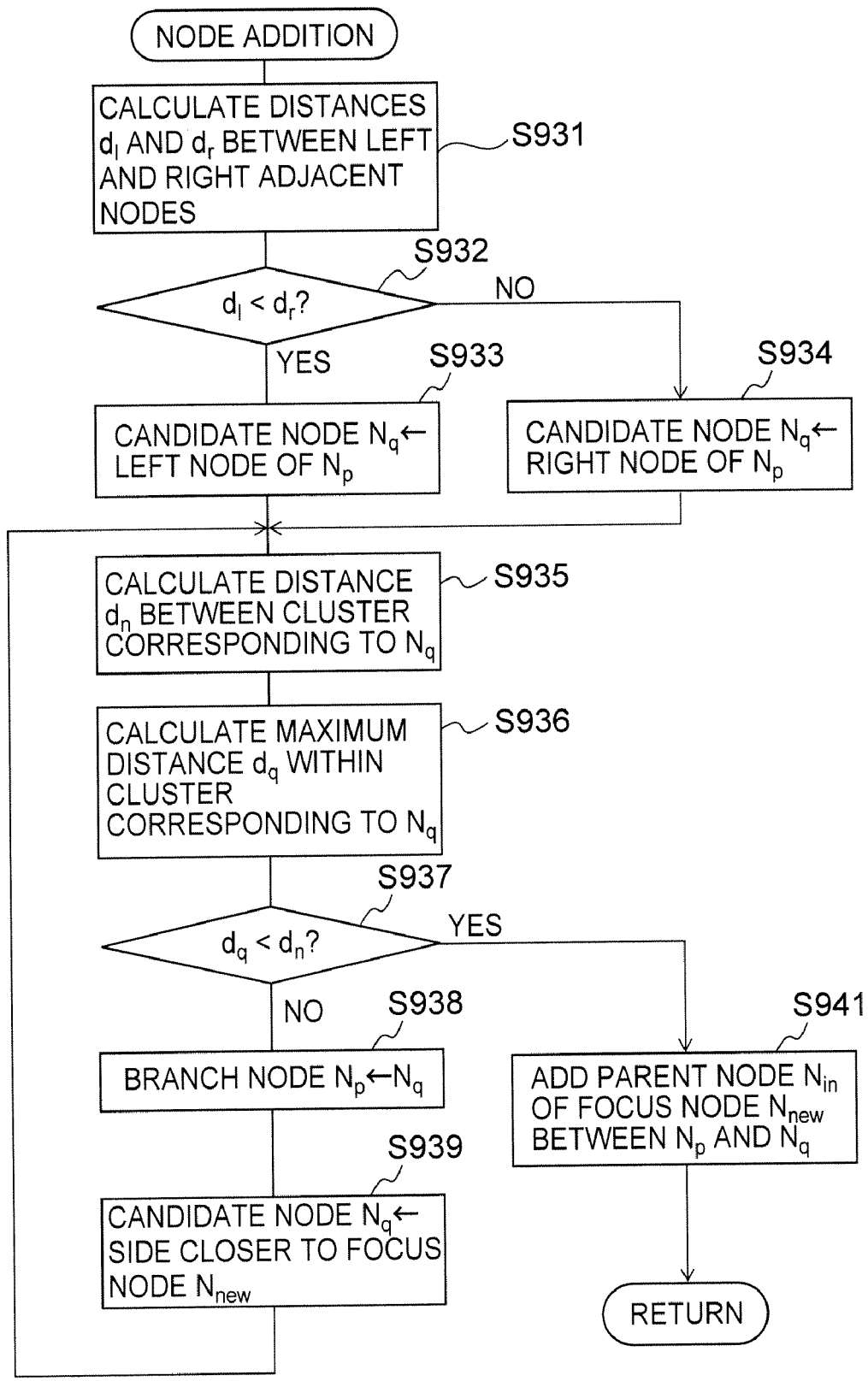
FIG. 20 is a flow chart indicating an example of a sequence of steps in a node adding process (step S930) in an embodiment of the present invention.

FIG. 20 is a flow chart indicating an example of the procedures of the node addition process (step S930) in an embodiment of the present invention. With reference to FIG. 7, the distance dl between the new image data $pic_{new}$ and the image data pic1, which corresponds to the left side rightmost node $R_m(l(N_p))$, and the distance $d_r$ between the new image data $pic_{new}$ and the image data pic2, which corresponds to the right side leftmost node $L_m(r(N_p))$ are calculated (step S931).

If, as a result, the distance $d_r$ is shorter (step S932), the candidate node $N_q$ is set to the right node $r(N_p)$ of the branch node $N_p$ (step S934), and if the distance $d_l$ is shorter (step S932), the candidate node $N_q$ is set to the left node $l(N_p)$ of the branch node $N_p$ (step S933).

Then, with respect to this candidate node $N_q$, the additional distance $d_n$ and the maximum distance $d_q$ are calculated (steps S935 and S936). If, as a result, the maximum distance $d_q$ is shorter than the additional distance $d_n$ (step S937), the node $N_{in}$ is inserted between the branch node $N_p$ and the candidate node $N_q$ (step S941). A child node that has this node $N_{in}$ as the parent node is placed as the focus node $N_{new}$.

On the other hand, if the additional distance $d_n$ is shorter than the maximum distance $d_q$ (step S937), in order to search the layers further down, the candidate node $N_q$ is set as a new branch node $N_p$ (step S938), while a candidate node $N_q$ that is closer to the focus node $N_{new}$ is set as a new candidate node $N_q$ (step S939). In other words, if the distance $d_r$ is shorter than the distance $d_l$, the candidate node $N_q$ is set as the right node $r(N_q)$ of the candidate node $N_q$, whereas if the distance dl is shorter than the distance $d_r$, the candidate node $N_q$ is set as the left node $l(N_q)$ of the candidate node $N_q$. Then, the steps from S935 and on are recursively executed, and ultimately, the insertion position for the node $N_{in}$ is determined (step S941).

Figure 21:
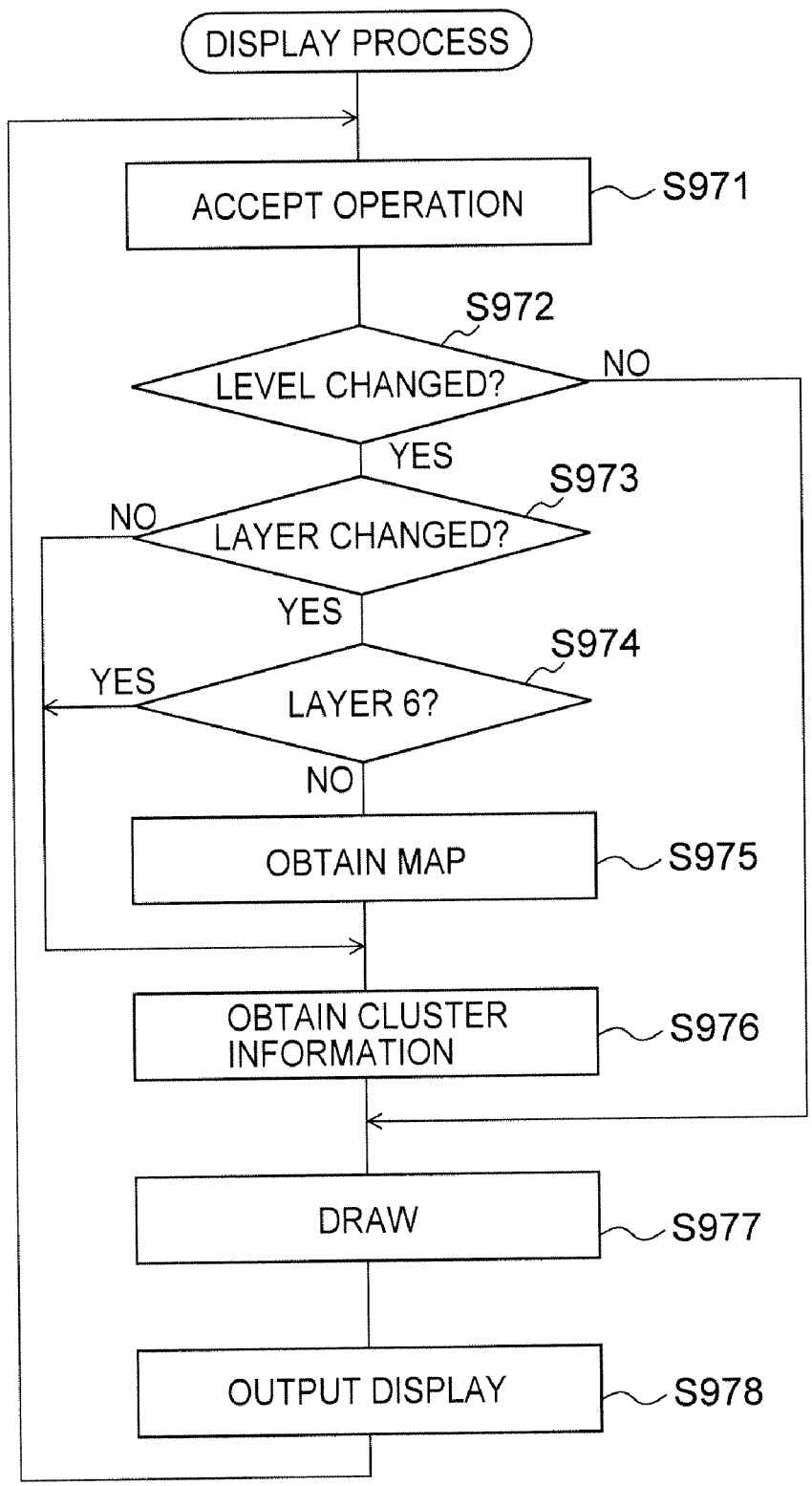
FIG. 21 is a flow chart indicating an example of a sequence of steps in an image location display process in an embodiment of the present invention.

FIG. 21 is a flow chart indicating an example of the procedures of the image location display process in an embodiment of the present invention. Once an enlargement or reduction operation by the user is accepted at the operation section 250 (step S971), it is determined at the display layer determining section 260 whether or not a change in layer and in level has occurred.

Then, if a change in layer and in level has occurred (step S972 and step S973), the map that is to be displayed next is obtained from the map information database 800 by the map obtaining section 240 (step S975). However, if a map does not exist in the map information database 800 as in layer 6 in FIG. 14F, the obtaining of a map is not performed (step S974).

Further, information on the cluster corresponding to that map is obtained from the cluster storage section 220 by the cluster managing section 230 (step S976). It is noted that when there is a change in level but not in layer, the obtaining of a map is not performed, but the obtaining of cluster information matching the new level is performed.

Then, based on the map and the cluster information thus obtained, a drawing process is performed by the drawing section 280 (step S977), and the result is drawn on the display section 290 (step S978). Thereafter, steps S971 and on are repeated.

Thus, according to an embodiment of the present invention, by making a portion of the hierarchical clusters managing image data in the cluster storage section 220 be fixed clusters, the management of clusters may be simplified. In addition, when the image location display of image data is performed by the drawing section 280, by making the symbol display for a portion of the layers be a fixed display, it is possible to perform the image location display linked with fixed clusters, in particular, with ease. Further, by carrying out the image location display of image data at relative positions, it is possible to allow for an intuitive understanding of the places at which the image data are captured even in cases where no relevant map exists in the map information database 800.

It is noted that in the embodiment of the present invention above, the symbol display with respect to layers 1 through 5 is fixed, and the symbol display with respect to layer 6 is relatively positioned, however, the present invention is not limited as such, and a relatively positioned display may be performed with respect to layers 5 and above as well. In addition, although the case above is one where maps corresponding to layers 1 through 5 exist in the map information database 800 and a map corresponding to layer 6 does not exist, the present invention is not limited as such, and is also capable of accommodating cases where no relevant map exists for layers 5 and above. In other words, in the embodiment above, it is assumed that the border between fixed clusters and variable clusters exists between layer 5 and layer 6, and a description is given with respect to a case where maps are provided and symbols are displayed in a fixed manner for the fixed clusters, while maps are not provided and symbols are displayed at relative positions for the variable clusters. However, the present invention is by no means limited thereto.

In addition, the embodiment above is merely presented as an example of an implementation of the present invention, and while it does have some correspondence with the elements in the Claims below, the present invention is not limited to the embodiment above, and various modifications may be made without departing from the scope of the invention.

In other words, in the Claims, image information storage means may correspond to, for example, the cluster storage section 220. In addition, cluster managing means may correspond to, for example, the cluster managing section 230. In addition, location information may correspond to, for example, the location information 622. Further, fixed property may correspond to the fix flag 690.

In addition, in the Claims, display layer determining means may correspond to, for example, the display layer determining section 260. In addition, drawing means may correspond to, for example, the drawing section 280. In addition, map storage means may correspond to, for example, the map information database 800. In addition, map obtaining means may correspond to, for example, the map obtaining section 240.

In addition, in the Claims, display layer specifying means may correspond to, for example, the operation section 250 and the display layer determining section 260.

In addition, in the Claims, a step of setting as an initial branch node a node that is close in distance to the location information of image data that is to be newly added at the layer directly beneath the fixed area may correspond to, for example, step S910. In addition, a step of recursively updating the branch node by tracing a node that is close in distance to the location information of the image data that is to be newly added at a node that is lower than the branch node may correspond to, for example, step S920. In addition, a step of generating, with a node that is close to the location information of the image data that is to be newly added at a node that is lower than the branch node as a candidate node, a new node between the branch node and a candidate node, and of linking a child node of that new node with the image data to be newly added may correspond to, for example, step S930.

In addition, in the Claims, a step of accepting an enlargement of reduction operation with respect to the image location display indicating the places at which the image data are captured may correspond to, for example, step S971. In addition, a step where, when, of the layers from the uppermost layer to the lowermost layer, a display layer to be displayed is altered through some operation, the relevant map is obtained if a map corresponding to the display layer is stored in the map storage means may correspond to, for example, steps S972 through S975. In addition, a step of drawing at the display layer and as the image location display the places at which the image data are captured based on the location information, and a step of superposing a map corresponding to the display layer with the image location display, if such a map is obtained, may correspond to, for example, step S977.

The process steps described with respect to the embodiment of the present invention above may be understood as a method including these steps, or they may be understood as a program that makes a computer execute these steps or as a recording medium that stores such a program.]

The present application contains subject matter related to Japanese Patent Application JP 2005-351400 filed in the Japanese Patent Office on Dec. 6, 2005, the entire content of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image managing apparatus, comprising:
 image information storage means for storing image information corresponding to captured image data;
 cluster managing means for managing the image information within a hierarchical structure of clusters including a plurality of clusters configured in a plurality of layers, the hierarchical structure being fixed from an uppermost layer to a predetermined layer such that the hierarchical structure is recursively searched only between the predetermined layer and a lowermost layer to add the image information to the hierarchical structure; and
 drawings means for drawing a layer to be displayed as a display layer, wherein
 if the display layer is between the predetermined layer and the lower most layer, the drawing means displays content of the captured image data as an image location display, and
 if the display layer is between the uppermost layer and the predetermined layer, the drawing means does not display the content of the captured image data as the image location display.

2. The image managing apparatus according to claim 1, wherein
 the image information includes location information on places at which the image data are captured, and
 the cluster managing means manages the image information in accordance with a relative distance based on the location information.

3. The image managing apparatus according to claim 1, wherein if a cluster has a fixed property, the cluster managing means performs management with a structure of the cluster fixed even if the cluster is of a layer lower than the predetermined layer.

4. An image display apparatus, comprising:
 image information storage means for storing location information on places at which image data are captured;
 display layer determining means for determining, of layers from an uppermost layer to a lowermost layer, a layer to be displayed as a display layer;
 drawing means for drawing with respect to the display layer the places at which the image data are captured as an image location display based on the location information;
 map storage means for storing a map for each layer from the uppermost layer to a predetermined layer on the way down to the lowermost layer; and
 map obtaining means for obtaining a map corresponding to the display layer if the map is stored in the map storage means, wherein
 if the map corresponding to the display layer is obtained by the map obtaining means, and the display layer is between the predetermined layer and the lowermost layer, the drawing means displays content of the image data as the image location display and superposes the map with the displayed content of the image data,
 if the map corresponding to the display layer does not exist in the image storage section, and the display layer is between the predetermined layer and the lowermost layer, the drawing means displays the content of the image data as the image location display based on the relative locations of the places at which the image data are captured, and
 the drawing means does not display the content of the image data as the image location display if the display layer is between the uppermost layer and the predetermined layer.

5. The image display apparatus according to claim 4, wherein
 if the map corresponding to the display layer is obtained, the drawing means draws the image location display based on a predetermined position on the map or based on relative locations of the places at which the image data are captured.

6. The image display apparatus according to claim 4, wherein
 if the map corresponding to the display layer is obtained, the drawing means draws the image location display at a predetermined position on the map.

7. The image display apparatus according to claim 4, wherein
 the drawing means does not display the content of the image data as the image location display if the map corresponding to the display layer is obtained, and
 the drawing means displays the content of the image data as the image location display if the map corresponding to the display layer is not obtained.

8. An image display apparatus, comprising:
 image information storage means that stores location information on places at which image data are captured;
 cluster managing means that manages the image information within a hierarchical structure of clusters including a plurality of clusters configured in a plurality of layers, the hierarchical structure being fixed from an uppermost layer to a predetermined layer such that the image information is added to the hierarchical structure only between the predetermined layer and a lowermost layer;

display layer specifying means that specifies, of layers from the uppermost layer to the lowermost layer, a layer to be displayed as a display layer;

drawing means that draws with respect to the display layer the places at which the image data are captured as an image location display based on the location information;

map storage means that stores a map for each layer from the uppermost layer to the predetermined layer; and map obtaining means that obtains a map corresponding to the display layer if the map is stored in the map storage means, wherein if the map corresponding to the display layer is stored in the map obtaining means, and the display layer is between the predetermined layer and the lowermost layer, the drawing means displays content of the image data as the image location display and superposes the map obtained by the map obtaining means with the displayed content of the image data, if the map corresponding to the display layer does not exist in the image storage section, and the display layer is below the predetermined layer, the drawing means displays the content of the image data as the image location display based on the relative locations of the places at which the image data are captured, and the drawing means does not display the content of the image data as the image location display if the display layer is between the uppermost layer and the predetermined layer.

9. An image managing method with respect to an image managing apparatus that manages location information on places at which image data are captured through a node tree of a tree structure, the image managing method comprising:

setting, as an initial branch node, a node in a layer directly beneath a predetermined layer of a fixed area, the node associated with image location information that is closer in distance to location information of new image data than image location information associated with another node in the layer directly beneath the predetermined layer, the fixed area including an uppermost layer and the predetermined layer located below the uppermost layer, and a condition such that the location information of the new image data can only be added between the predetermined layer and a lowermost layer;

identifying a first node that is lower than the branch node as a candidate node, the first node associated with image location information that is closer in distance to the location information of the new image data than image location information associated with a second node that is lower than the branch node;

determining, using image location information associated with the candidate node, a maximum distance between all images associated with the candidate node;

determining a proximal image associated with the candidate node having image location information closer to the location information of the new image data than all other images associated with the candidate node;

determining a proximal distance between the location information of the new image data and the proximal image;

recursively updating the branch node to the candidate node upon determination that the maximum distance is greater than the proximal distance;

inserting a new node between the branch node and the candidate node upon determination that the proximal distance is greater than the maximum distance; and linking a child node of the new node with the new image data.

10. A non-transitory computer readable medium having stored thereon computer executable instructions that when executed by a processor in an image managing apparatus that manages location information on places at which image data are captured through a node tree of a tree structure, cause the image managing apparatus to execute a method comprising:

setting, as an initial branch node, a node in a layer directly beneath a predetermined layer of a fixed area, the node associated with image location information that is closer in distance to location information of new image data than image location information associated with another node in the layer directly beneath the predetermined layer, the fixed area including an uppermost layer and the predetermined layer located below the uppermost layer, and a condition such that the location information of the new image data can only be added between the predetermined layer and the lowermost layer;

identifying a first node that is lower than the branch node as a candidate node, the first node associated with image location information that is closer in distance to the location information of the new image data than image location information associated with a second node that is lower than the branch node;

determining, using all image location information associated with the candidate node, a maximum distance between all images associated with the candidate node;

determining a proximal image associated with the candidate node having image location information closer to the location information of the new image data than all other images associated with the candidate node;

determining a proximal distance between the location information of the new image data and the proximal image;

recursively updating the branch node to the candidate node upon determination that the maximum distance is greater than the proximal distance;

inserting a new node between the branch node and the candidate node upon determination that the proximal distance is greater than the maximum distance; and linking a child node of the new node with the new image data.

11. An image displaying method with respect to an image managing apparatus that includes image information storage means that stores location information of places at which image data are captured and map storage means that stores a map for each layer from an uppermost layer to a predetermined layer on the way down to a lowermost layer, the image managing method comprising:

accepting an enlargement or reduction operation with respect to an image location display indicating the places at which the image data are captured;

obtaining a map if a display layer to be displayed, of layers from the uppermost layer to the lowermost layer, is switched due to the operation, and if a map corresponding to the display layer is stored in the map storage means;

drawing with respect to the display layer and as the image location display the places at which the image data are captured based on the location information;

superposing the image location display with the map corresponding to the display layer if the map is obtained; and drawing the image location display based on the relative locations of the places at which the image data are captured if the map corresponding to the display does not exist in the image storage section, wherein content of the image data is displayed as the image location if the display layer is between the predetermined layer and the lowermost layer, and content of the image data is not displayed as the image location information if the display layer is between the uppermost layer and the predetermined layer.

12. A non-transitory computer readable medium having stored thereon computer executable instructions that when executed by a processor in an image managing apparatus that includes image information storage means that stores location information of places at which image data are captured and map storage means that stores a map for each layer from an uppermost layer to a predetermined layer on the way down to a lowermost layer, cause the image managing apparatus to execute a method comprising:

accepting an enlargement or reduction operation with respect to an image location display indicating the places at which the image data are captured;

obtaining a map if a display layer to be displayed, of layers from the uppermost layer to the lowermost layer, is switched due to the operation, and if a map corresponding to the display layer is stored in the map storage means;

drawing with respect to the display layer and as the image location display the places at which the image data are captured based on the location information;

superposing the image location display with the map corresponding to the display layer if the map is obtained; and drawing the image location display based on the relative locations of the places at which the image data are captured if the map corresponding to the display does not exist in the image storage section, wherein content of the image data is displayed as the image location if the display layer is between the predetermined layer and the lowermost layer, and content of the image data is not displayed as the image location information if the display layer is between the uppermost layer and the predetermined layer.

13. An image managing apparatus, comprising:

a storage to store image information corresponding to captured image data;

a controller configured to manage the image information within a hierarchical structure of clusters including a plurality of clusters configured in a plurality of layers, the hierarchical structure being fixed from an uppermost layer to a predetermined layer such that the hierarchical structure is recursively searched only between the predetermined layer and a lowermost layer to add the image information to the hierarchical structure; and a drawings section to draw a layer to be displayed as a display layer, wherein if the display layer is between the predetermined layer and the lower most layer, the drawing section displays content of the captured image data as an image location display, and if the display layer is between the uppermost layer and the predetermined layer, the drawing section does not display the content of the captured image data as the image location display.

14. An image display apparatus, comprising:

an image information storage section configured to store location information on places at which image data are captured;

a display layer determining section configured to determine of layers from an uppermost layer to a lowermost layer, a layer to be displayed as a display layer;

a drawing section configured to draw with respect to the display layer the places at which the image data are captured as an image location display based on the location information;

a map storage section configured to store a map for each layer from the uppermost layer to a predetermined layer on the way down to the lowermost layer; and a map obtaining section configured to obtain a map corresponding to the display layer if the map is stored in the map storage section, wherein if the map corresponding to the display layer is obtained by the map obtaining section, and the display layer is between the predetermined layer and the lowermost layer, the drawing section displays content of the image data as the image location display and superposes the map with the displayed content of the image data, if the map corresponding to the display layer does not exist in the image storage section, and the display layer is between the predetermined layer and the lowermost layer, the drawing section is configured to draw the content of the image data as the image location display based on the relative locations of the places at which the image data are captured, and the drawing section does not draw the content of the image data as the image location display if the display layer is between the uppermost layer and the predetermined layer.

15. An image display apparatus, comprising:

image information storage means for storing location information on places at which image data are captured;

display layer determining means for determining, of layers from an uppermost layer to a lowermost layer, a layer to be displayed as a display layer;

drawing means for drawing with respect to the display layer the places at which the image data are captured as an image location display based on the location information;

map storage means for storing a map for each layer from the uppermost layer to a predetermined layer on the way down to the lowermost layer; and map obtaining means for obtaining a map corresponding to the display layer if the map is stored in the map storage means, wherein if the map corresponding to the display layer is obtained by the map obtaining means, the drawing means superposes the map with the image location display, the drawing means does not display the content of the image data as the image location display if the map corresponding to the display layer is obtained, and the drawing means displays the content of the image data as the image location display if the map corresponding to the display layer is not obtained.

16. The image display apparatus according to claim 14, wherein if the map corresponding to the display layer is obtained, the drawing section draws the image location display based on a predetermined position on the map or based on relative locations of the places at which the image data are captured.

17. The image display apparatus according to claim 14, wherein if the map corresponding to the display layer is obtained, the drawing section draws the image location display at a predetermined position on the map.

18. The image display apparatus according to claim 14, wherein the drawing section does not display the content of the image data as the image location display if the map corresponding to the display layer is obtained, and the drawing section displays the content of the image data as the image location display if the map corresponding to the display layer is not obtained.

* * * * *